(12) United States Patent
Shortt

(10) Patent No.: US 12,095,832 B2
(45) Date of Patent: *Sep. 17, 2024

(54) METHOD FOR A VIDEO CONTENT DISTRIBUTION AND MESSAGING PLATFORM PROVIDING PERSONALIZED VIDEO FEEDS

(71) Applicant: SNIBBLE CORP., Toronto (CA)

(72) Inventor: Andrew Keith Shortt, Toronto (CA)

(73) Assignee: SNIBBLE CORP., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,133

(22) Filed: Jun. 21, 2022

(65) Prior Publication Data

US 2022/0394068 A1    Dec. 8, 2022

Related U.S. Application Data

(63) Continuation of application No. 17/159,749, filed on Jan. 27, 2021, now Pat. No. 11,399,047.
(Continued)

(51) Int. Cl.
*H04L 65/401* (2022.01)
*H04L 51/04* (2022.01)
(Continued)

(52) U.S. Cl.
CPC .......... *H04L 65/4015* (2013.01); *H04L 51/04* (2013.01); *H04L 51/10* (2013.01);
(Continued)

(58) Field of Classification Search
CPC ....... H04L 51/04; H04L 51/10; H04L 51/224; H04L 51/214; H04L 51/52; H04L 65/4015; H04L 65/612; H04L 65/762; H04N 21/251; H04N 21/26258; H04N 21/2668; H04N 21/4755; H04N 21/4788; H04N 21/4825; H04N 21/6582; H04N 21/274; H04N 21/8456; H04N 21/8586; G06F 16/14; G06F 3/0481; G06F 3/0482; G06F 40/289; G06N 3/044
See application file for complete search history.

(56) References Cited

U.S. PATENT DOCUMENTS

| 2011/0231887 | A1* | 9/2011 | West | H04N 21/274 |
| | | | | 725/116 |
| 2012/0030554 | A1* | 2/2012 | Toya | H04N 21/8586 |
| | | | | 715/206 |

(Continued)

*Primary Examiner* — Le H Luu

(57) ABSTRACT

A computer-implemented method for providing, through a computer network via a server computer, a video content distribution and messaging platform to communicate video content from a plurality of content sources to respective user devices of platform users, and for enabling platform users to share the video content with their friends. The method comprises receiving, at the platform, a video recommendation from a first platform user for an instance of video content distributed to the first platform user, the video recommendation to be communicated to at least one other platform user who is a friend of the first platform user. The method further comprises sending from the platform the video recommendation to the at least one other platform user who is a friend.

19 Claims, 23 Drawing Sheets

Related U.S. Application Data

(60) Provisional application No. 62/966,068, filed on Jan. 27, 2020.

(51) Int. Cl.
    *H04L 51/10*     (2022.01)
    *H04L 51/224*     (2022.01)
    *H04L 65/612*     (2022.01)
    *H04L 65/75*     (2022.01)
    *H04N 21/25*     (2011.01)
    *H04N 21/262*     (2011.01)

(52) U.S. Cl.
    CPC .......... *H04L 51/224* (2022.05); *H04L 65/612* (2022.05); *H04L 65/762* (2022.05); *H04N 21/251* (2013.01); *H04N 21/26258* (2013.01)

(56) References Cited

U.S. PATENT DOCUMENTS

| | | | |
|---|---|---|---|
| 2013/0103814 A1* | 4/2013 | Carrasco | H04L 65/4015 709/231 |
| 2014/0108932 A1* | 4/2014 | Soderstrom | G06F 3/0482 715/719 |
| 2014/0359647 A1* | 12/2014 | Shoemake | H04N 21/6582 725/10 |
| 2016/0094501 A1* | 3/2016 | Lee | H04L 51/52 709/206 |
| 2019/0164369 A1* | 5/2019 | Rubchinsky | H04H 60/33 |
| 2019/0200064 A1* | 6/2019 | Louis | G06F 40/289 |
| 2019/0268650 A1* | 8/2019 | Avedissian | G06F 3/0481 |
| 2019/0342255 A1* | 11/2019 | Gravino | H04L 51/214 |
| 2020/0029117 A1* | 1/2020 | Kalva | H04N 21/8456 |
| 2020/0184278 A1* | 6/2020 | Zadeh | G06N 3/044 |

* cited by examiner

2000 providing, through a computer network via a server computer, a video content distribution and messaging platform to communicate video content from a plurality of content sources to respective user devices of platform users, the platform users having respective subscriptions to receive instances of video content from the platform and wherein the platform associates two or more of the platform users as friends in accordance with respective permissions of the two or more platform users 2010 receiving, at the platform, a video recommendation from a first platform user for an instance of video content distributed to the first platform user, the video recommendation to be communicated to at least one other platform user who is a friend of the first platform user 2020 sending from the platform the video recommendation to the at least one other platform user who is a friend 2030

Figure 2

METHOD FOR A VIDEO CONTENT DISTRIBUTION AND MESSAGING PLATFORM PROVIDING PERSONALIZED VIDEO FEEDS

CROSS-REFERENCE

This application is a continuation of U.S. application Ser. No. 17/159,749 filed Jan. 27, 2021, the content of which is incorporated herein by reference in its entirety. U.S. Application No. 62/938,492 claims the benefit of U.S. Provisional Application No. 62/966,068 filed Jan. 27, 2020, the content of which is incorporated herein by reference in its entirety.

TECHNICAL FIELD

The present disclosure relates to a video content distribution and messaging platform and, more particularly, to a method for sharing video content between friends on a video content distribution and messaging platform.

BACKGROUND

Traditional video content distribution platforms do not provide functionality for sharing video content between friends on the platform. To share video content with their friends, users need to rely on a separate communications or social media platform. Such platforms provide the following ways for users to discover new video content: text-based search and algorithmic recommendation engines based on a user's past viewing habits. Said existing platforms also do not enable users to customize and personalize their feed of videos.

The present disclosure aims at providing an improved method for sharing and discovering new video content on a video content distribution platform.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a computer-implemented method for providing, through a computer network via a server computer, a video content distribution and messaging platform to communicate video content from a plurality of content sources to respective user devices of platform users, wherein the platform associates two or more of the platform users as friends in accordance with respective permissions of the two or more platform users. The method comprises receiving, at the platform, a video recommendation from a first platform user for an instance of video content distributed to the first platform user, the video recommendation to be communicated to at least one other platform user who is a friend of the first platform user. The method further comprises sending from the platform the video recommendation to the at least one other platform user who is a friend.

The video recommendation may be sent for display as a feed of videos.

Any of the user devices may comprise a mobile device.

The method may further comprise receiving a shared playlist from the first platform user and sending the shared playlist to the at least one other platform user who is a friend.

The method may further comprise receiving from the at least one other platform user a comment in reply to the video recommendation and sending the comment to the first platform user for display with the instance of video content, wherein the comment is only visible to the first platform user and the at least one other platform user.

The method may further comprise receiving video preferences of a platform user and sending a personalized feed of video content for display to the platform user.

The method may further comprise streaming an instance of video content to respective user devices of two or more platform users who are friends. Optionally, the instance of video may be streamed for synchronized display by the respective user devices to enable the friends to view the video simultaneously. Optionally, the two or more platform users may be remotely located from one another.

The method may further comprise providing a friendship interface to enable a particular platform user to invite another platform user to be a friend on the platform and associating as friends in accordance with a response providing permission from the other platform user.

The method may further comprise communicating instances of video content to respective platform users in accordance with each platform user's respective subscriptions.

In addition to a computer implemented method aspect, other aspects including computing unit and computer program product aspects will be apparent. A computer program product comprises a non-transient storage device (e.g. memory, storage media (CD, DVD, tape, thumb drive/SD or other card, etc.)) storing instructions that when executed by a processing unit of a computing unit configure the computing unit to perform a method.

BRIEF DESCRIPTION OF THE DRAWINGS

Further features and exemplary advantages will become apparent from the following detailed description, taken in conjunction with the appended drawings, in which:

FIG. 2 is a flow chart of an exemplary method for providing a video content distribution and messaging platform;

Figure 1:
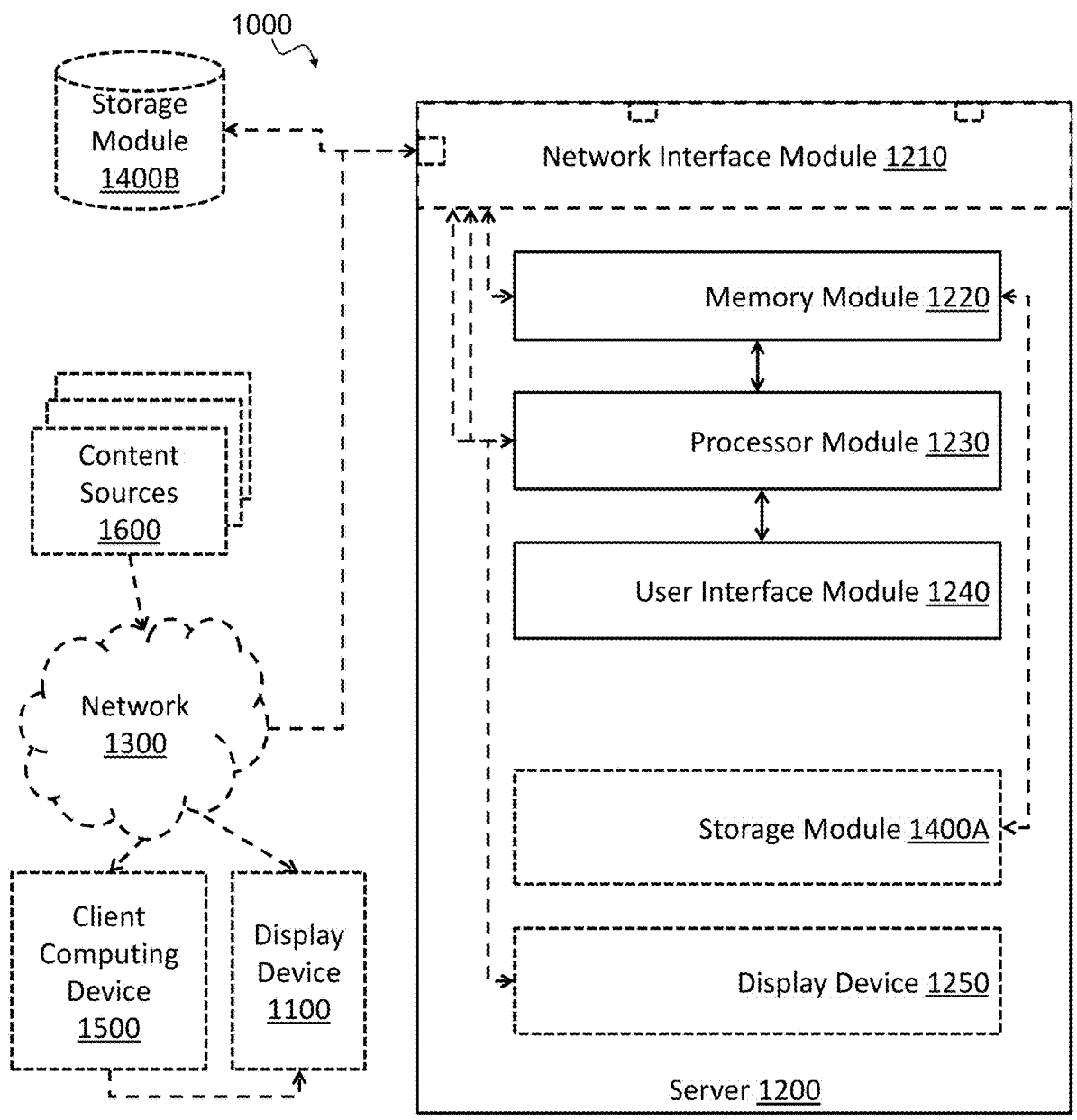
FIG. 1 is a logical modular representation of an exemplary system comprising a server for providing a video content distribution and messaging platform.

In various screenshots, content items such as images, titles, source names or portions thereof are shown generically for copyright and/or trademark or related purposes so as not to reproduce material that may be subject to copyright, that is a trademark or that may suggest endorsement by another.

DETAILED DESCRIPTION

There is shown and described a video content distribution and messaging platform comprising a server, a network, and one or more client computing devices. In a preferred embodiment, the client computing devices are mobile devices, and the users of the platform access the platform through a mobile app on their mobile devices. Third parties provide video content for distribution through the platform to users of the client computing devices. The server provides a feed of video content to the users of the platform. The users may customize the feed of video content that they receive from the server based on their preferences. For example, they may add, remove, and order categories and subcategories of video content so that the video content in the feed reflects the user's interests and appears in the user's preferred order. Since the content in the feed reflects the user's preferences, the user is able to easily find interesting video content on the platform simply by scrolling through their personalized feed. The users are able to play the video content on their client computing devices. The user interface on the client computing device provides a recommend button that enables the users to recommend videos to their friends. The platform associates two or more users as friends. Users may associate themselves as friends by sending and receiving friend requests or invitations through the platform. The platform may recommend friends to a target user by searching the platform for other users that appear in a directory of contacts on the target user's computing device. When a user recommends a particular video, the client computing device sends the video recommendation to the server through the network. The server then sends the video recommendation through the network to the client computing devices of one or more friends of the user. In the preferred embodiment, the recommendation is sent to all the friends of the user. In another embodiment, the user identifies the one or more friends who will receive the video recommendation. In another embodiment, the platform identifies the one or more friends who will receive the video recommendation, for example based on their preferences, past viewing habits, or other factors. The recommended video is displayed in a friend feed on the client computing devices of the one or more friends of the user. The friend feed comprises a feed of videos that have been recommended by a user's friends. In this manner, users of the platform have a feed of videos that is curated by their friends. Users can thus easily discover video content on the platform that is of interest to them by scrolling through their friend feed. The platform thus provides two improved means for discovering video content: a personalized feed that comprises video content that reflects a user's interests and a friend feed that comprises a feed of videos recommended by a user's friends. The personalized feed and the friend feed may be two separate feeds or integrated into a single feed.

The platform integrates social media with video content distribution. For example, the platform enables friends to chat with one another in relation to particular video content. The platform enables friends to share playlists of video content. The platform enables friends to view video content simultaneously in real-time from remote locations.

The platform enables advertisers to advertise on the platform. For example, the platform may play a short video advertisement before the video content is played. In a preferred embodiment, the video advertisement may be a six second video clip. In a preferred embodiment, the video advertisement consists of a single video clip shown at the beginning of the video content and is not shown in the middle of the video content. The platform may alternatively provide for image-based or text-based advertising. The platform provides a number of features to promote brand safety. For example, the chat feature on the platform may be restricted so that comments on video content are not public. That is, only friends may see a user's comments on a video so that it is not possible for third parties or the public to see a user's comments with respect to a video. This protects the brand of the advertiser whose advertising is shown in association with the video content by reducing the audience for a comment that could harm the advertiser's brand. Promoting brand safety increases the advertising revenue generated by the platform.

FIG. 1 shows a logical modular representation of an exemplary system 1000 in accordance with the teachings herein. The system 1000 comprises a server 1200 for providing a video content distribution and messaging platform. The server 1200 comprises a memory module 1220, a processor module 1230, a user interface module 1240, a network interface module 1210, and a storage module 1400A. The storage module 1400A may be a standard hard disk drive, a solid state drive, a tape drive, RAID storage, or any form of non-volatile memory that meets the various requirements for storing and retrieving data. A storage module 1400B may be externally connected to the server 1200. The storage module 1400B may be a remote network storage connected to the server 1200 via the network 1300 (not shown). Alternatively, or in addition, the storage module 1400A may be integrated with the server 1200. The server 1200 may further comprise a display device 1250, which may be a remote display device connected to the server 1200 through the network 1300 (not shown), a display device directly connected to the server 1200 (not shown), or an integrated display device 1250. The network interface module 1210 is for sending and receiving data through the network 1300 to and from the plurality of remote client computing devices 1500.

The system 1000 also comprises a plurality of client computing devices 1500, which may be personal computers, laptops, tablets, or mobile devices. In the preferred embodiment, the client computing devices 1500 are mobile devices. The platform, hosted by the server 1200, communicates video content from a plurality of content sources 1600 to respective client computing devices 1500. Each of the client computing devices 1500 may further comprise a display device 1100, which may be a remote display device 1100 connected to the client computing device 1500 through the network 1300, a display device 1100 directly connected to the client computing device 1500, or an integrated display device (not shown). The client computing devices 1500 may further comprise a network interface module (not shown) for sending and receiving data through the network 1300 to and from the server 1200.

Each of the plurality of content sources 1600 may comprise at least one respective server (not shown) and data store (not shown) storing content (e.g. video content, etc.) for communicating to respective client devices 1500.

The system 1000 further comprises a network 1300 for connecting the server 1200 and the client computing devices 1500. Communication over the network 1300 may occur using e.g., TCP/IP and Ethernet or ATM SONET/SDNET; over air, copper wires, optical fiber, or any other physical support capable of carrying data. In the preferred embodiment, the network 1300 is the Internet. The client computing devices 1500 may be connected to the network 1300 in a variety of ways, such as via a wired network, via a cellular network, via Wi-Fi, or via Bluetooth. A skilled person will understand that the server 1200 may comprise multiple servers 1200 in a cluster or other similar shared-processing or distributed-processing architectures, whether in a single location or over cloud computing.

Reference is now made concurrently to FIG. 1 and FIG. 2, which shows an exemplary method 2000 for providing a friend feed on a video content distribution and messaging platform. The method 2000 comprises providing 2010, through a computer network 1300 via a server computer 1200, a video content distribution and messaging platform to communicate video content from a plurality of content sources 1600 to respective user devices 1500 of platform users. The platform associates two or more of the platform users as friends in accordance with respective permissions of the two or more platform users.

Video content may be selected for respective users based on the user's respective user data. User data may be defined from respective subscriptions to receive instances of video content from the platform. Subscriptions herein is a broad term and is not limited to paid subscriptions nor to subscriptions or requests to receive specific individual or related instances of content. A subscription broadly includes a request to receive content via the platform and is generally made by a user who has signed up to the terms of service of the platform. As described further, a user may define a profile indicating various demographic data about the user and/or interest related data (which interests may be broad such as a topic (sports) or more granular (extreme sports) or even more granular (winged suit cliff jumping)) about the user and may include requests to include or exclude content related to topics (or more granular divisions), etc. from which a feed of content may be defined from the available content sources. Content at the plurality of content sources is updated with new content regularly (e.g. daily or more frequently, etc.). As described further, content may be feed to a user device using real time sharing operations to select content of interest. Advertisements may be provide in association with the content, for example, before an instance of content or during an instance, etc. An advertisement may be a static or animated/video image, audio, combination, etc. Content sources may include news services (e.g. for current affairs, politics, sports, business, lifestyle, travel, health, technology, entertainment, opinion/editorial, etc. content), media and other entertainment companies (e.g. film companies, streaming services, publishers, etc. about any topic), sports leagues and their broadcasters, etc., governments, etc. Any topic may be represented with content.

In a preferred embodiment, the video content on the platform is premium short form video clips each produced and provided by third party video content providers. In a preferred embodiment, the users of the platform do not provide any video content in order to ensure the quality of the video content available on the platform and to promote brand safety. The video content may be hosted on the platform itself (e.g., on server 1200, where it may be stored on storage module 1400 (e.g. 1400A or 1400B) or may be hosted remotely, for example by the third party providers of the video content such as at sources 1600.

The users of the platform access the video content through their client computing devices 1500, for example through a mobile app on a mobile device or tablet or through a website on a computer or other device. The user interface on the client computing device 1500 provides a feed of video content to the user, which may show a representative thumbnail for each instance of video content to enable the user to access and play the video content. The user interface showing the personalized feed of video content may be displayed on the display device 1100 of the client computing device 1500. The user interface may be rendered locally on the client computing device 1500 or remotely on the server 1200 by the user interface module 1240. When the user selects a particular instance of video content for playback, the video content is streamed from the server 1200 or third party server to the user's client computing device 1500 through the network 1300. The user interface on the client computing device 1500 may provide a means for the user to determine the third party content provider that provided a particular instance of video content. For example, the name of the content provider may appear when the user hovers a cursor over the video content or thumbnail of the video content. This feature promotes trust in the video content. The users of the platform may have subscriptions to particular video content (e.g. to specific topics, sub topics, etc.), which determines, at least in part, the content of their video feed and what video content they can access. A search interface (See FIG. 12) may be provided for a user to locate and receive content such as by using keywords, images, etc. Any of the interfaces herein may be graphical user interfaces and/or voice enabled.

Two or more of the platform users may be associated to one another as friends on the platform. For example, the friends relationship between the users may be stored in a database on a storage module 1400 of the server 1200. The friends association is made in accordance with the permission of both users. For example, a first user may send a friend invite to a second user, wherein the second user may accept the friend request to complete the friend association between the two users. The friend association between two or more platform users is to enable sharing of video content and discussions regarding video content between the two or more platform users.

The method 2000 further comprises receiving 2020, at the platform, a video recommendation from a first platform user for an instance of video content distributed to the first platform user, the video recommendation to be communicated to at least one other platform user who is a friend of the first platform user. The user interface on the client computing device 1500 provides a means for recommending a particular instance of video content. For example, with reference to FIG. 8, the user interface 8000 is currently playing video content 8010 and provides recommendation button 8020 to enable the platform user to recommend the video content 8010 to their friends. The platform user may recommend a video by clicking on the recommendation button 8020 such that the client computing device 1500 receives a user input corresponding to the platform user's video recommendation. When the platform user recommends a particular instance of video content, the client computing device 1500 sends the video recommendation through the network 1300 to the server 1200. The server 1200 receives the video recommendation through the network interface module 1210 and may temporarily store the video recommendation in the memory module 1220. The processor module 1230 of the server 1200 may then store the video recommendation on the storage module 1400. The processor module 1230 may store the video recommendation in a database on the storage module 1400. The processor module 1230 may store the video recommendation in association with the platform user that recommended the video content.

Figure 3:
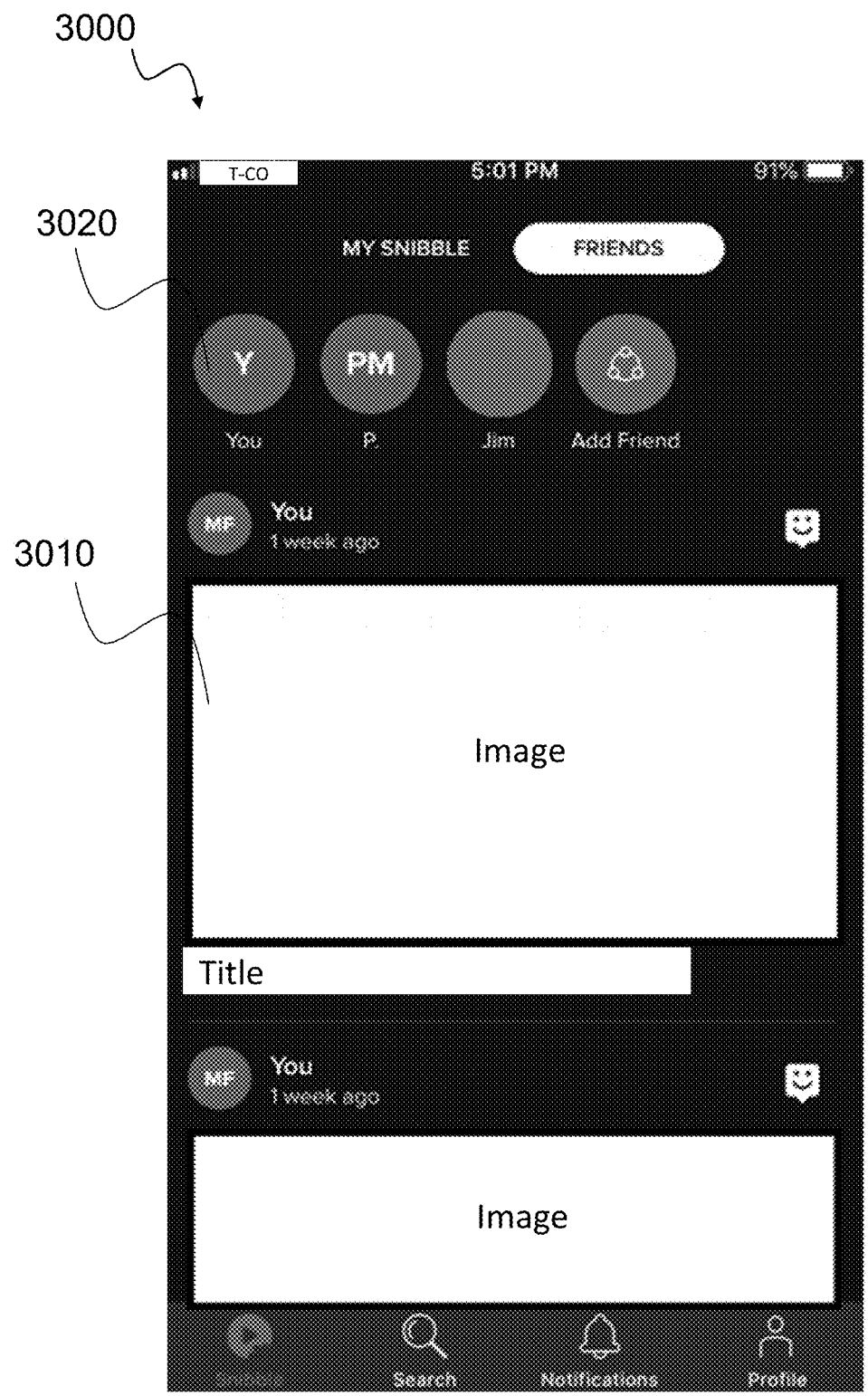
FIG. 3 illustrates an example of a feed of videos recommended by a user's friends.

The method 2000 further comprises sending 2030 from the platform the video recommendation to the at least one other platform user who is a friend. The processor module 1230 computes a list of friends of the first platform user that submitted the video recommendation. The processor module 1230 may do this by looking up the first user's friends on the storage module 1400 or in a database on the storage module 1400. The server 1200 sends the video recommendation submitted by the first user to the client computing devices 1500 of one or more friends of the first user through the computer network 1300 via the network interface module 1210. In a preferred embodiment, the server 1200 sends the video recommendation to all of the friends of the first user. The client computing devices 1500 display the video recommendation on the display device 1100, enabling the friends to playback the video that has been recommended by the first platform user. Optionally, the video recommendation is displayed on the client computing devices 1500 of the friends as a feed of video content, the friend feed. Optionally, the video recommendation may appear in the friend feed of the first user that recommended the video. With reference to FIG. 3, the user interface on the client computing devices 1500 for displaying the friend feed 3000 displays a list of the friends of the user on the platform 3020. The friend feed user interface 3000 further displays a list of thumbnails 3010 representing the videos that have been recommended by a user's friends on the platform. The user may then click on the thumbnail to playback the videos 3010 that have been recommended by their friends. The friend feed 3000 enables platform users to easily find video content on the platform that is of interest to them. The friend feed 3000 is a feed of videos that is curated by a user's friends, who may have similar tastes in video content. As compared to a text-based search, the friend feed requires less input from the user and is more likely to find new and interesting video content that the user had not thought to look for. As compared to an algorithm-based recommendation engine, the friend feed is more likely to suggest video content that is of interest to the user but that may not be related to video content that the user has already watched. That is, platform users may be provided with better recommendations for video content. A friend feed provides an improved means for friends to share video content with one another.

Optionally, at least one of the user devices 1500 comprises a mobile device. The client computing devices 1500 may be mobile devices. The platform user may access the platform via a mobile app provided on the mobile device 1500.

Figure 8:
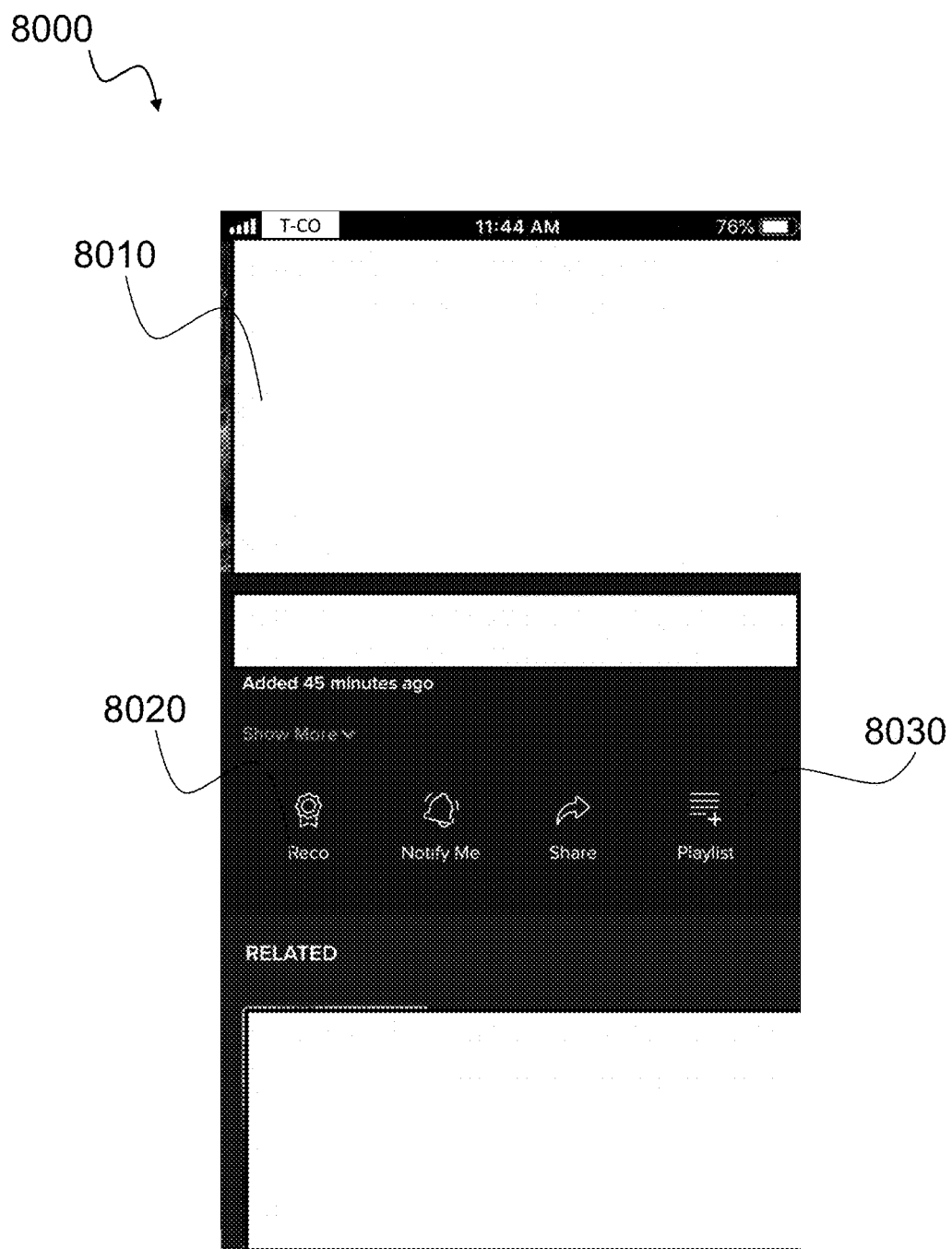
FIG. 8 illustrates an example user interface for viewing a video.

Optionally, the method 2000 further comprises receiving a shared playlist from the first platform user and sending the shared playlist to the at least one other platform user who is a friend. The platform may provide another means for sharing video content between friends. A first user may add one or more instances of video content to a playlist at their client computing device 1500. With reference to FIG. 8, the user interface 8000 on the client computing device 1500 may provide, for example, an add-to-playlist button 8030 for adding a particular video to a playlist. In this manner, the first user may add one or more videos to a playlist. The first user may then share the playlist containing one or more videos with one or more friends. For example, the user interface may provide a share button, which enables the user to share the playlist with one or more friends. The client computing device 1500 sends the playlist through the network 1300 to the server 1200. The server 1200 receives the playlist through the network interface module 1210. The processor module 1230 of the server 1200 may store the shared playlist on a storage module 1400 of the server 1200. The server 1200 may send the shared playlist to the client computing devices 1500 of one or more friends of the first user through the network 1300 via the network interface module 1210. The shared playlist is displayed on the client computing devices 1500 of the one or more friends. The friends may playback the videos in the playlist that has been shared with them. In one embodiment, the shared playlist appears on a notification screen of the user interface of the client computing devices 1500 of the one or more friends with whom the playlist was shared. In one embodiment, the first user may select the friends with whom the playlist is shared. In another embodiment, the server 1200 may automatically select the friends with whom the playlist is shared. In another embodiment, the playlist may be shared with all the friends of the first user.

Figure 6:
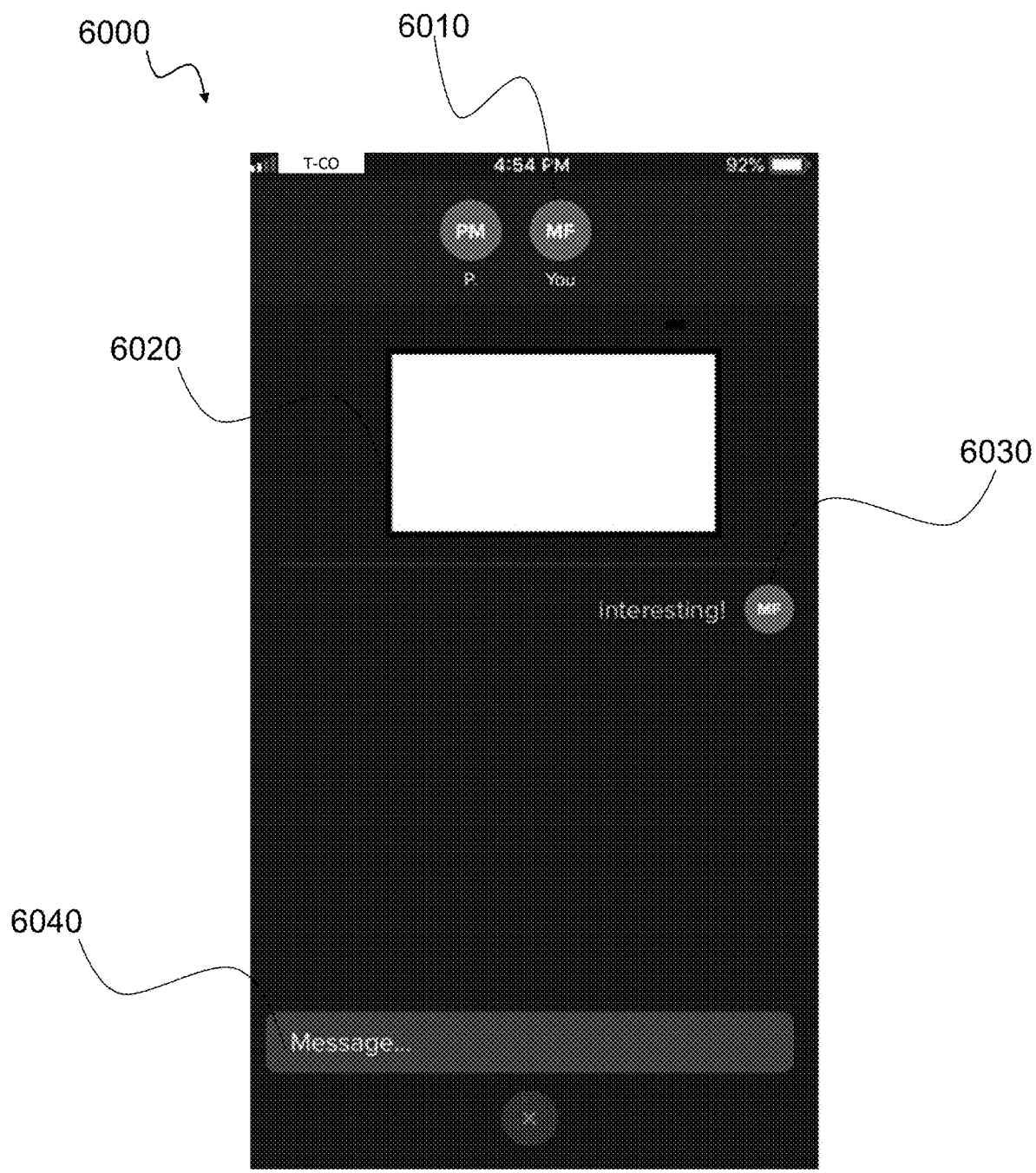
FIG. 6 illustrates an example chat message in relation to a video.

Optionally, the method 2000 further comprises receiving from the at least one other platform user a comment in reply to the video recommendation and sending the comment to the first platform user for display with the instance of video content, wherein the comment is only visible to the first platform user and the at least one other platform user. Users are enabled to communicate with one another on the platform via chat messages. For example, a first user may recommend a video to a second user, wherein the first user and second user are associated as friends on the platform. As already described, the video recommendation may appear in a friend feed on the client computing device 1500 of the second user. With reference to FIG. 6, the user interface 6000 on the client computing device 1500 may then provide a text entry form 6040 to enable the second user to enter a comment or chat message in relation to the recommended video 6020. The user interface 6000 may also provide a list of the users 6010 that are participating in the chat in relation to the video 6020. The chat message or comment entered by the second user is sent by the client computing device 1500 through the network 1300 to the server 1200. The server 1200 may store the chat message or comment on a storage module 1400 of the server 1200 in association with a particular video or playlist and in association with the first user and the second user. The server 1200 may send the chat message or comment to the client computing device 1500 of the first user through the network 1300, such that the chat message or comment 6030 appears in the user interface 6000 of both the first user and the second user. The chat message or comment may appear on a notification screen of the user interface of client computing device 1500 of the first user. The first user and the second user can exchange multiple chat messages or comments back-and-forth, with the chat messages or comments 6030 appearing in chronological order in the user interface. The chat messages or comments 6030 may be in relation to an instance of video content, a shared video playlist, or a video recommendation. Platform users may also send chat messages and comments independently of any particular video content, playlist, or recommendation. A chat session may be between two or more platform users. The chat messages or comments may be visible only to the friends in the chat. That is, the chat messages or comments may not be visible to third parties outside of the chat or the public. Alternatively, the chat messages or comments may be visible to some or all the friends of the platform users in the chat session. That is, the chat messages or comments are visible to some third parties outside the chat, but not to the public in general. By not making the chat messages and comments visible to the public, the platform promotes brand safety on the platform. An advertiser who displays advertising in association with the video content 6020 does not run the risk of a public comment on the platform harming their brand because all chat messages and comments are visible to only a restricted set of platform users. Chat messages or comments 6030 may be associated and displayed with particular instances of video content or playlists, which encourages and enables platform users to share and discuss the video content on the platform. This feature represents one aspect of the integration of video content distribution and social media on a single platform.

Figure 4:
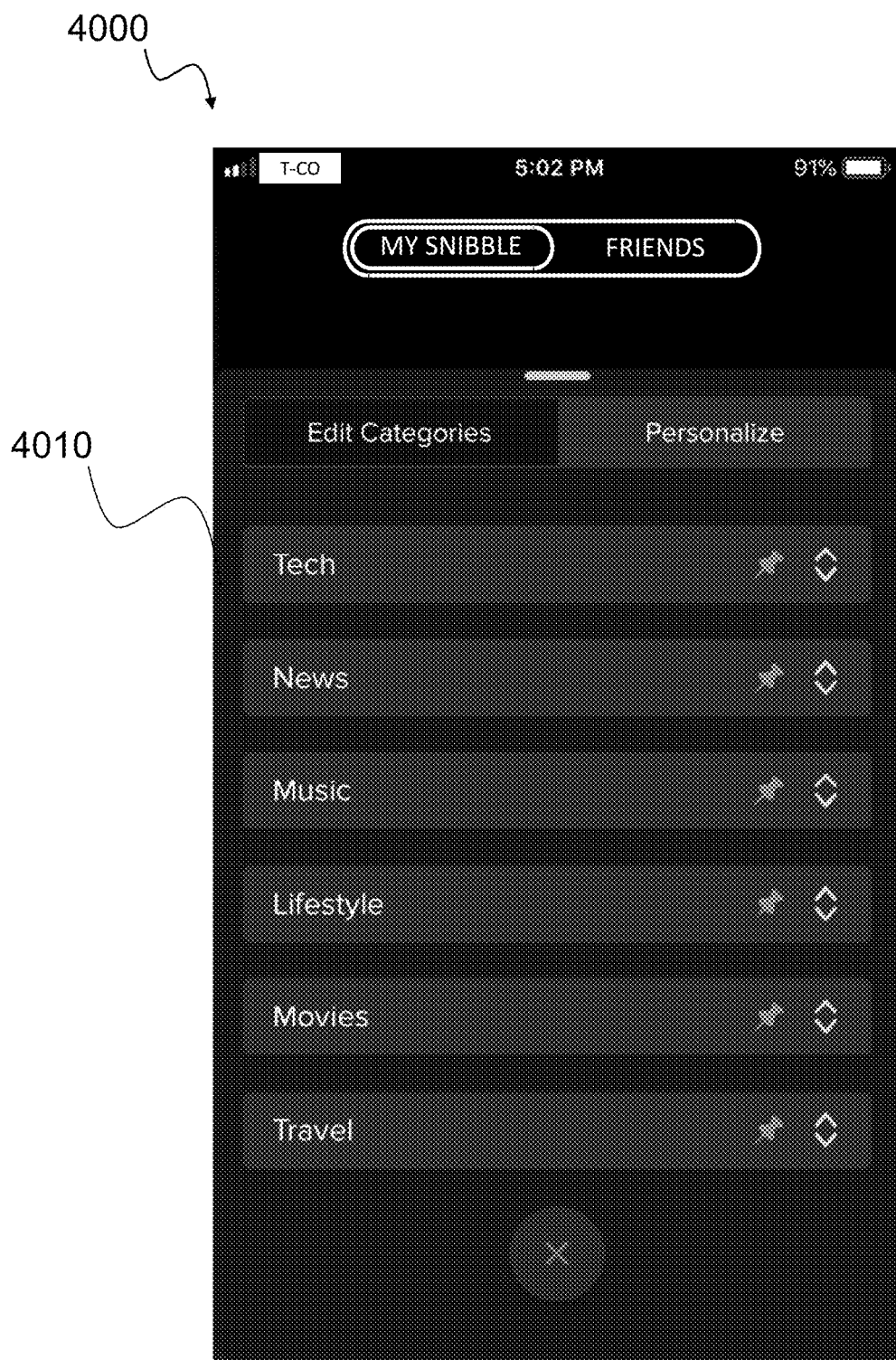
FIG. 4 illustrates an example of categories for personalizing a feed of videos.
Figure 5:
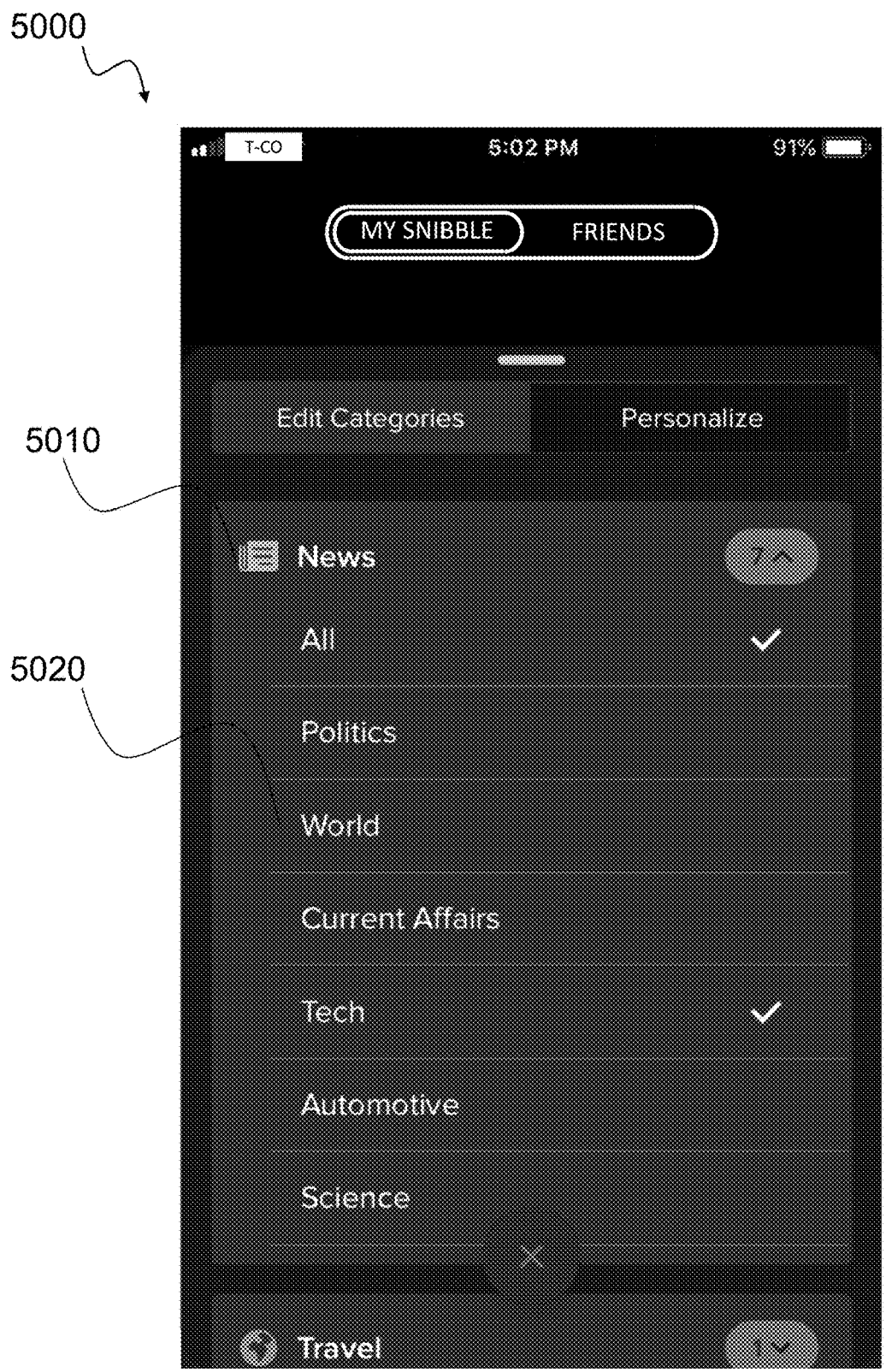
FIG. 5 illustrates an example of subcategories for personalizing a feed of videos.
Figure 7:
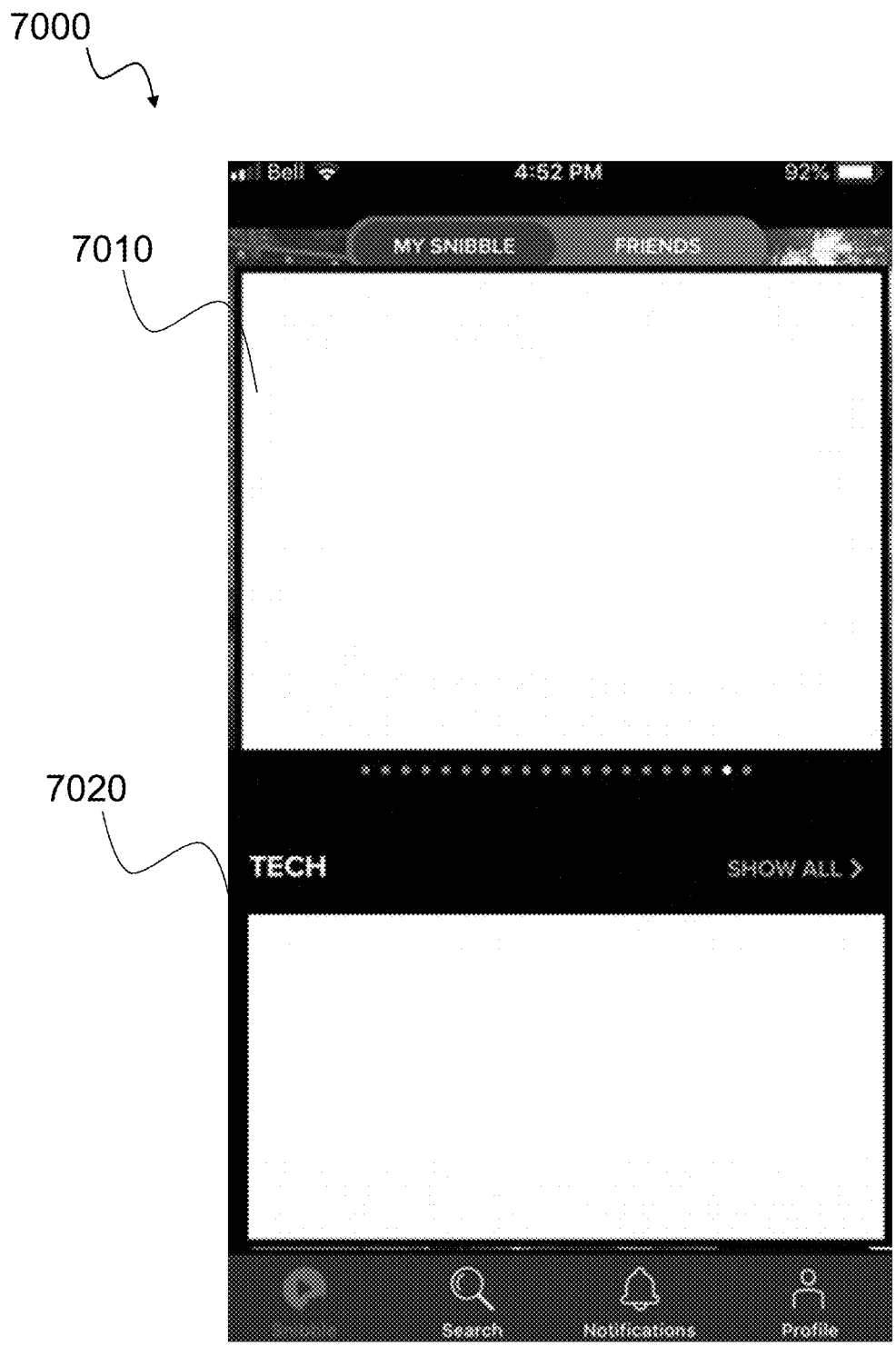
FIG. 7 illustrates an example personalized feed of videos.

Optionally, the method 2000 further comprises receiving video preferences of a platform user and sending a personalized feed of video content for display to the platform user. With reference to FIG. 4 and FIG. 5, the user interface 4000 and 5000 on the client computing device 1500 may enable platform users to customize their feed of videos. For example, the user interface 4000 may present the platform user with a variety of categories 4010 of video content. For example, the platform user may add and remove categories 4010 or reorder categories 4010. The platform user may be able to create their own categories. The platform user may also be able to pin a category so that it always appears in a particular location in the video feed. With reference to FIG. 5, the user interface 5000 may enable the platform user to further personalize the feed of videos. The user interface 5000 enables the user to drill down from categories 5010 into subcategories 5020 to select those specific subcategories of video content that the user is interested in. With reference to FIG. 7, the user interface 7000 shows a customized feed of videos to the user 7010 and 7020 in accordance with their preferences that they entered into the user interface 4000 and 5000. For example, the feed of videos will display the feed of videos in categories according to the order of the categories 4010 specified by the user. Furthermore, if the user removed any categories, video content in these categories will not be shown in the user's video feed 7000. In FIG. 5, the user has selected the subcategory "Tech" 5020 in the broader category of "News" 5010. The user's video feed user interface 7000 reflects this preference, showing "Tech" 7020 in the video feed 7000. In the video feed 7000, different categories may be presented vertically, so that the user may see different categories by scrolling or swiping up and down. In each category 7010, 7020 there are a plurality of videos within that category. The user may access the different videos within a particular category by scrolling or swiping left and right. The first category 7010 may be a general category that contains video content that is currently trending or that is selected based on other criteria, regardless of the preferences of the user. The category preferences of the user may be stored locally on the client computing device 1500 or remotely on the server 1200. The personalized video feed presents video content that is in line with the user's preferences. The video feed content is therefore more likely to be of interest to the user, and it makes it easier for the user to find video content on the platform that is of interest to them.

Optionally, the method 2000 further comprises streaming an instance of video content to respective user devices of two or more platform users who are friends, wherein the instance of video is streamed for synchronized display by the respective user devices to enable the friends to view the video simultaneously. A first user may invite a second user to watch an instance of video content in real-time. When the second user accepts the invitation, the server 1200 may begin streaming an instance of video content to the two client computing devices 1500 of each of the first user and the second user so that the video is displayed synchronously on both devices, such that both the first user and the second user are watching the same instance of video content at the same time. This real-time viewing of video content may involve more than two users. Optionally, the two or more platform users may be remotely located from one another. While simultaneously viewing the same video content, the platform users may chat with each other in real-time regarding the video content that they are watching.

Optionally, the method 2000 further comprises providing a friendship interface to enable a particular platform user to invite another platform user to be a friend on the platform and associating as friends in accordance with a response providing permission from the other platform user. One or more platform users may be associated as friends on the platform. The association of the one or more platform users as friends may occur as follows. A user interface on the client computing device 1500 may enable a first platform user to send an invite to a second platform user to become friends. The client computing device 1500 of the first platform user sends the invitation to the server 1200 via the network 1300. The server 1200 sends the friend invitation to the client computing device 1500 of the second platform user via the network 1300. The user interface on the client computing device 1500 of the second platform user presents the invitation to the user. If the second platform user accepts the invitation, the client computing device 1500 sends the acceptance to the server 1200 via the network 1300. The server 1200 associates the first platform user and the second platform user as friends. The server 1200 may send a notification to the client computing device 1500 of the first platform user via the network 1300 to inform the first platform user that the second platform user has accepted the invitation. The second platform user may alternatively reject the invitation. In which case, the client computing device 1500 sends the rejection to the server 1200 via the network 1300, and the server 1200 does not associate the first platform user and the second platform user as friends. The server 1200 may send a notification of the rejection to the client computing device 1500 of the first platform user.

Optionally, the method 2000 further comprises communicating instances of video content to respective platform users in accordance with each platform user's respective user data. The data may be defined in response to subscriptions and may be defined in response to further data obtained or inferred about the platform user such as from the platform user's use of the platform. As previously noted, each platform user may subscribe to particular categories of video content, such as sports, entertainment, or news. There may be extra fees associated with subscribing to particular categories of video content. The user interface 7000 presenting the feed of video content may include the categories of video content that the platform user has subscribed to. Records of the platform user's subscriptions may be stored on the client computing device 1500 or in the server 1200.

User Data Inference and Data Use

As noted, system 1000 may provide advertisements targeted to specific platform users. The advertisements may be provided in association with the feed of content provided to the client device: for example, a short (e.g. 6 second) video advertisement may precede the playing of a content item).

The video advertisement may be automatically played and video controls disabled during the short duration. A longer advertisement may be provided and the advertisement may be skippable after initially playing automatically for the short duration.

Figure 9:
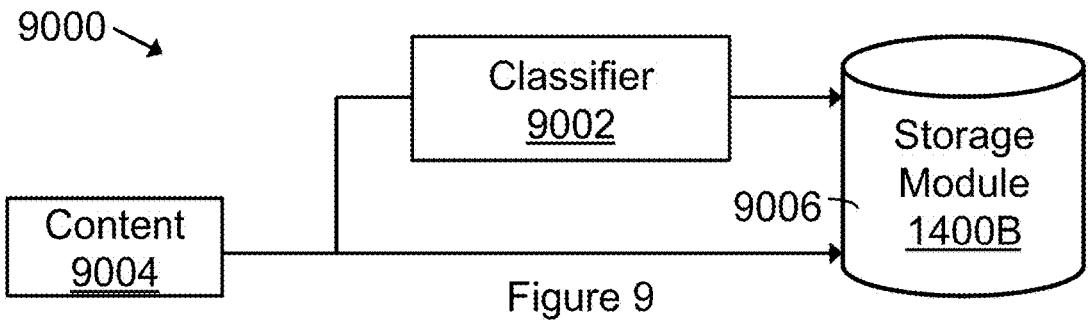
FIGS. 9 to 11 show various structures of the system of FIG. 1 to perform respective operations to classify content, share content in user feeds and define user data through monitoring messages between a user device and a server of the system of FIG. 1.
Figure 10:
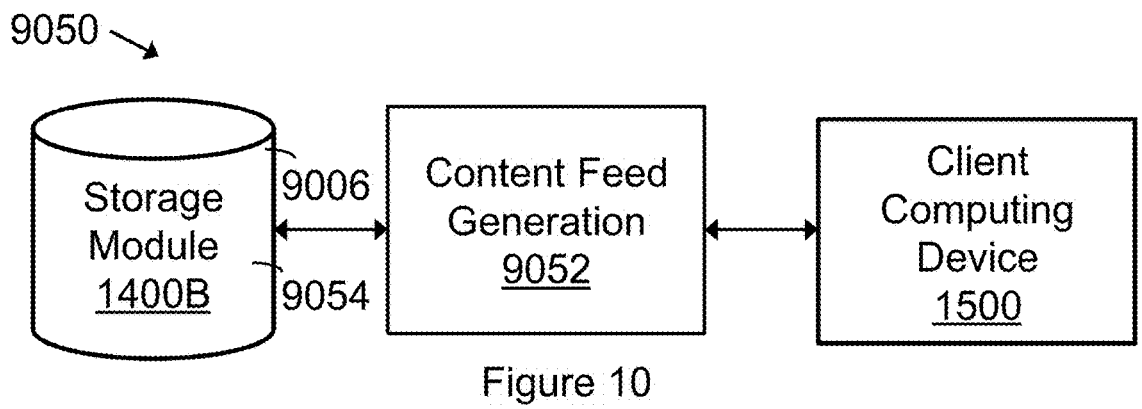
Figure 11:
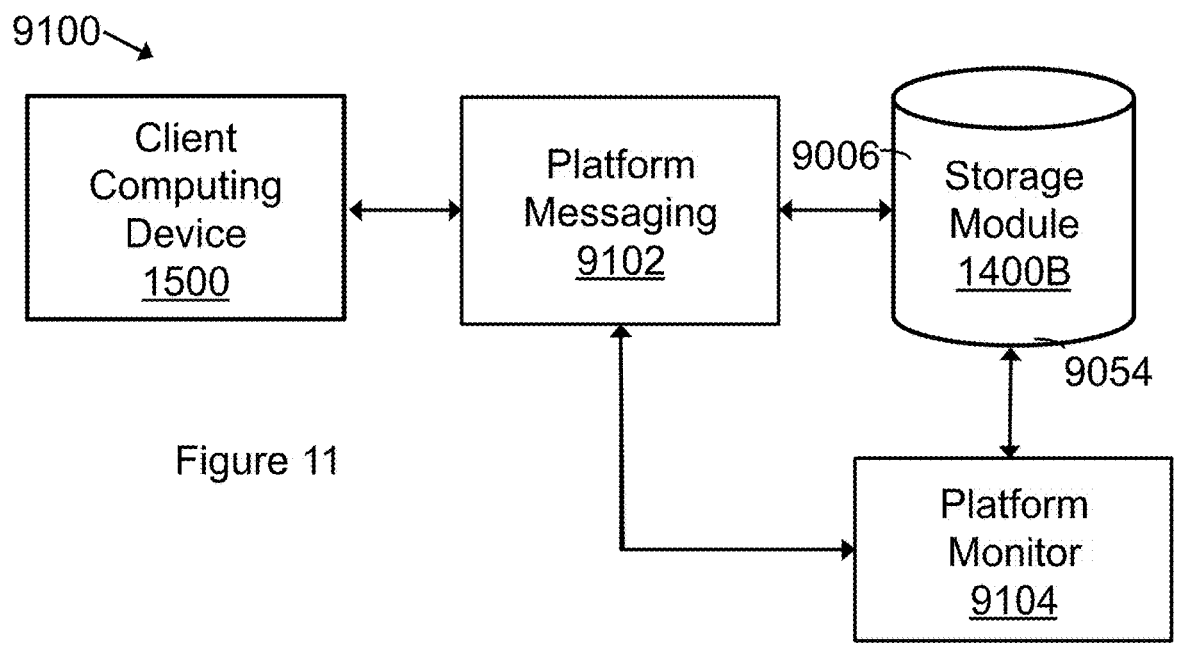

To determine which advertisement to serve and/or to determine which instances of content items from sources 1600 to provide in the platform user's feed, system 100 may collect various data and analyze such data to infer additional data. Such data may comprise classification data related to the instances of content and user data related to a respective platform user. FIGS. 9-11 show simplified structures of system 1000 to generate and/or use such data.

Classification

FIG. 9 is a block diagram showing simplified structure 9000 to classify content. A classifier component 9002 of server 1200 may comprise software stored in one of the applicable modules of server 1200. In the present embodiment, server 1200 receives an instance of content 9004 from one of the plurality of content sources 1600. The instance 9004 is stored in storage module 1400 (e.g. 1400B). It is understood that such storage is optional. The instance 9004 is provided to classifier 9002, which defines classification data 9006 related to the instance 9004. The classification data 9004 is stored in storage module 1400B. The instance of content 9004 may comprise metadata (not shown) about the content instance 9004 for use to define the classification data 9006. The metadata may be separate from the content instance 9004 or embedded therein such as in accordance with a standard for encoding data in a file format. Classifier 9000 may analyze the instance of content 9004 (e.g. converting audio to text, etc.) and perform semantic analysis (and/or other analysis) to determine the classification data 9006. Classification data 9006 may be useful to determine whether the instance of content 9004 will be provided to a particular user (e.g. particular device 1500) as content in the user's feed. Classification data 9006 may be useful to determine whether to associate a particular advertisement with the instance of content.

It is understood that the instance of content 9004 need not be stored to storage module 1400B. A link or other data construct may be stored to enable retrieval of the instance of content 9004 from a content server (e.g. one of sources 1600 or a server of a content distribution network (not shown)). Classification may be performed (and content data 9004 communicated to server 1200) by respective content sources (respective ones of 1600) or by another server (not shown) in system 1000.

FIG. 10 shows structure 9050 for selecting content instances for a user. There is shown a content feed generation component 9052 in communication with storage module 1400B and a respective client computing device 1500. It is understood that content feed generation component 9052 may comprise software stored in one of the applicable modules of server 1200.

Content feed generation component 9052 may utilize classification data 9006 and user data 9054 to select content for the user's content feed. Content feed generation component 9052 may also select advertisements for display in (in association with) the content feed that are targeted to the user based on the user data 9054 and classification data 9006.

User data 9054 may comprise data as previously described including various demographic data and subscription data and as further described such as data determined about the user from the user's use of the platform (e.g. system 1000 and/or server 1200 and the user's application on device 1500).

FIG. 11 shows structure 9100 including platform messaging component 9102 and platform monitor component 9104, which may be software stored in any of the applicable modules of server 1200. Platform monitor component determines, at least part of, the user data 9054. As shown in FIG. 11, client device 1500 communicates via messages with server 1200 via platform messaging component. Certain message content may be stored to or obtained from storage module 1400 such as module 1400B. Platform messages may comprise many types of messages, including: the user's interactions with the user's profile (defining, updating, etc.), a user's definition of a playlist, a user's sharing or receiving of a shared playlist, a friend invitation (generated or received) and/or a response to a friend invitation (generated or received), user messages to or from friends regarding instances of content or otherwise, the content feed itself, interactions with the content feed (e.g. which content is viewed, etc.), sharing instances of the feed to one or more friends (i.e. recommending an instance of content to a friend or receiving a sharing message), search data (e.g. keywords, etc.), advertisements, interactions with instances of the advertisements (a click for more data, other engagement measure data), platform feedback (e.g. from platform solicitations about features or ratings, etc.), etc.

Platform monitor component 9104 may monitor any messages for any data therein or related thereto. Time data (e.g. amount and/or time of day), date and/or day of the week data, location data, friend data, etc. may be collected and monitored by component 9104 in association with any of the above. Non-platform data such as browser history data or other client app data (e.g. for which the user has provided permissioned access) may also be reviewed and used to generate user data 9054.

Platform monitor component 9104 may review the classification data for the instances of content for additional details and/or associate the user data that component 9104 generates with the respective instances of the classification data 9006. All such data provided to platform monitor component 9104 may be used to define user data 9054 that provides insight into the user's likely hood to receive instances of content for the user's feed and/or instances of advertisements.

Search

Figure 12:
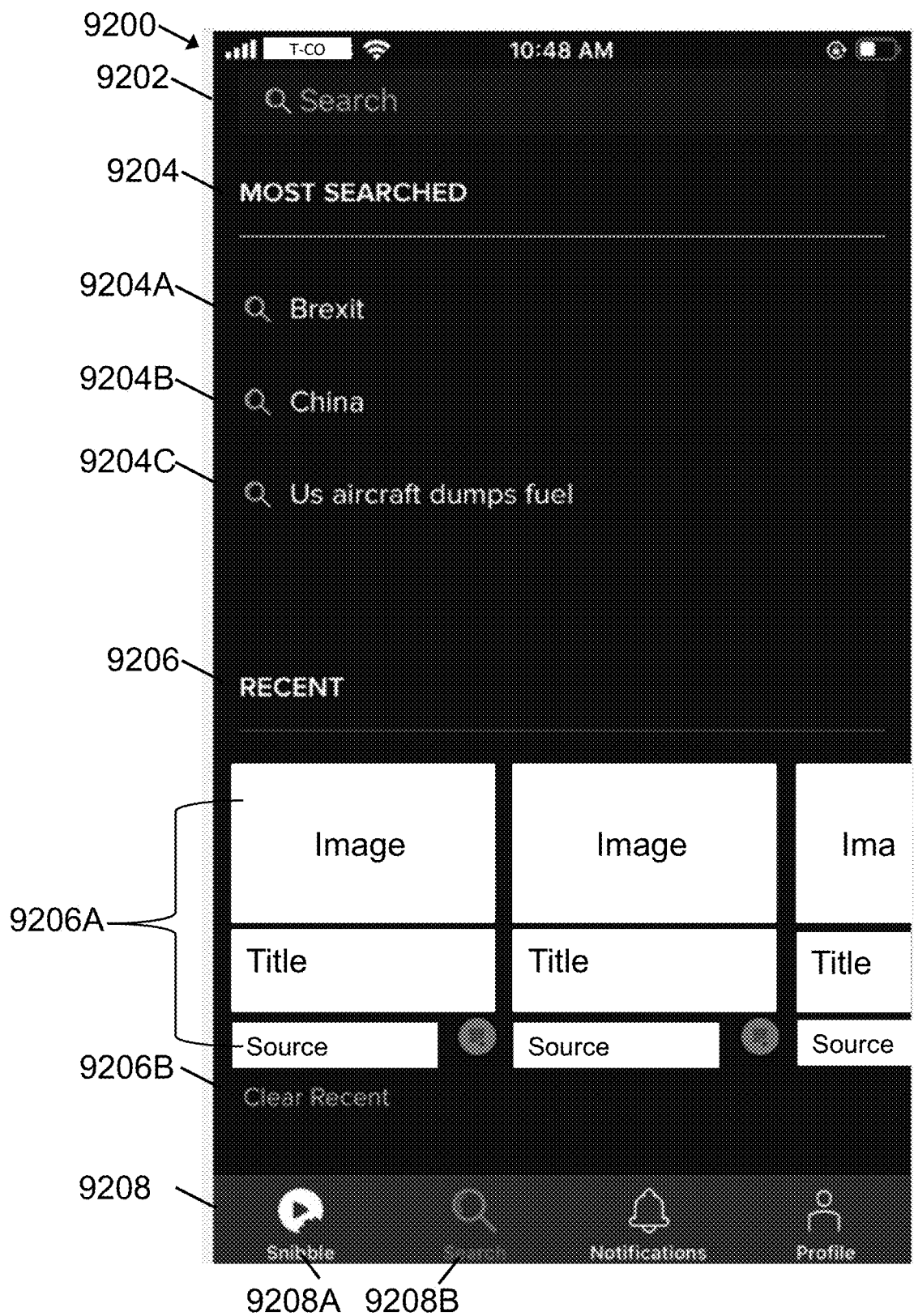
FIG. 12 is a screenshot of a search interface in accordance with an example.

FIG. 12 is a screenshot of a search interface 9200 in accordance with an example. Search interface 9200 is shown as a GUI. Though not shown, it may have voice capability such as to receive dictated keywords, commands, etc.

Search interface 9200 is configured for display on display device 1100 and has a portion 9202 to receive keywords for searching. There is a portion 9204 showing most frequently searched terms (e.g. over a recent time period such as the last hour, etc. and may relate to all user of the application/platform or to fewer users such as those having similarities to the present user) including respective most searched items 9204A, 9204B and 9204C. Each of the most search items may have an associated control which may be invoked to have the search items searched for the present user (and the user's device).

Search interface 9200 also has a portion 9206 showing recent search results for the present user (user's device) including a plurality of content items (e.g. 9206A). The portion 9206 may be configured as a swipe enabled list to navigate through the recent search terms (e.g. left and right). Each content item may be associated with a respective control to play (invoke a presentation (e.g. display and/or audio playing)) of the content item. Other controls may be provided (e.g. to share, subscribe to the content provider, etc.). An icon and control may facilitate various functions/features for a respective content item.

Each content item shown in search interface 9200 may comprise a thumbnail image of the content, a content title and a content source provider (e.g. a name). This format for the content item may be, but need not be, used whenever a content item is shown in any interface. Controls may be associated with one or more of the parts of the content item. For example a control may be associated with the title and image to invoke a playing. A different control may be associated with the name to invoke other commands (e.g. to display information about the content provider, to subscribe, etc.). One or more other controls may be associated with a content item.

Portion 9206 may include a clear recent control 9206B. The clear recent control 9206B may delete the search request such as from a history of such requests and/or remove from portion 9206 the recent search results.

Search interface 9200 has an app functions control portion 9208 in which icons and associated controls (e.g. 9208A, 9208B) are provided such as to invoke features or functions, typically switching between a current to a new interface associated with the respective feature or function. An icon of a current interface (e.g. 9208B associated with search interface 9200) may be distinguished from the other icons (e.g. by using different color, highlighting, blinking, etc.) to denote it is the current interface. App functions control portion 9208 shows icons to invoke, respective interfaces to: present the user's Snibble content feed (primary screen to receive content); perform a search, view notifications and view/edit the user's profile. The notifications function is discussed with respect to FIGS. 25-27.

Real Time Sharing

The platform (i.e. respective server and client components) facilitates real-time sharing (RTS) of content between friends. A first user may select a single content item or define a playlist of content items (e.g. via a playlist control) using their respective user device. The first user may request the server component to share the content item or playlist, via an invitation to participate, with at least one friend of the first user for viewing at a same time but via respective user devices of the friends. The RTS may be requested such as by using a real time sharing control on the user's device. The RTS control may invoke an RTS invitation interface to add at least one friend to an RTS invitation (a type of message). Once the invitation is defined by the first user (using the user's device), the invitation is sent to the server for communication to the respective friends. This type of sharing is contrasted with regular sharing or recommending. In regular sharing or recommending, a content item or playlist is shared or recommended via a message communicated via the server from a first user device to one or more friends for playing (or not) at the time of the respective friend's choosing. That is each friend may independently choose when or if to view such shared or recommended content.

A friend receiving an RTS invitation may accept (or not) the invitation. An invitation that is not accepted may convert to a recommend or share notification—a message that advises the friend that the first user recommended specific content. The content of such a recommendation may then be played at the friend's choosing but not along with the other friends in an RTS session.

Once an RTS invitation is accepted, an RTS session commences for the shared video or playlist. Even if only a single friend accepts, such an RTS session commences. Other friends who later accept the invitation while the RTS session is in progress will join the RTS session, if it is still occurring.

During an RTS session, the first user and the accepting friends each are presented with the content item that is the subject of the RTS. This may be a single content item or a plurality of items such as from a playlist of content items. Content items from the playlist may be played in succession such as in accordance with the order of the playlist (e.g. in a default mode of play). Each content item, whether a single item or from a playlist, is played via a player in an RTS session interface on each user device participating in the RTS session. Video content is played by a video player. Audio only content may be played via an applicable player. The first user may control the player operations for all participants to the RTS session, for example, pausing, stopping, skipping forward or backward, etc. In an RTS session with a playlist, the first user may navigate the playlist and select items to be played on behalf of all of the participants, for example, out of the default play order.

During an RTS session, various RTS session events may be logged. For example, interactions by the first user with the player in the RTS session interface may be logged. Interactions by the first user with the playlist via the RTS interface may be logged (e.g. selecting particular content from the list to start play via the player). An end of the RTS session (e.g. the streaming activity) may be logged such as when the single content item is finished playing or the playlist is finished. A control may enable a restart of such a session to restart the streaming to all of the devices together.

The RTS session interface may provide a multi-party (e.g. a group) chat interface permitting each of the participants to engage in a group chat (e.g. text messages, emoji, etc.), simultaneously, while the content item(s) is(are) presented. The events logged may be populated as system messages in the chat, for example, to advise each participant about the first user's activities/interactions with the video player and playlist, etc. Systems messages may be distinguished from session participant chat messages such as by font, color or lack of a source indicator.

Real time sharing thus allows friends to experience content virtually together as it is streamed or otherwise distributed to each of the user devices participating in the session. The RTS session may be initiated by an invitation with a start to the session triggered by acceptance by a single participant. Chat features associated with the RTS session allow real-time communication such as about the content item.

It will be understood that one or more of the modules of server 1200 (or modules coupled thereto, including a separate server or servers), may be configured with a streaming component which facilitates communication of RTS content item(s) to RTS session participants via their respective devices so that the devices receive the same content item for playing in a synchronized manner. It is understood that network delay, etc. may mean that playing content items on respective devices is not exactly simultaneously experienced but such content items are practically simultaneously experienced. Various multi-cast or broadcast techniques may be employed. It will also be understood that some techniques may have inherent limitations that limit the number of participants.

It will be understood that one or more of the modules of server 1200 (or modules coupled thereto, including a separate server or servers), may be configured with messaging capabilities to permit one or more friends to engage in a conversation. The conversation may be help in association with (at the same time as) a RTS session or otherwise. The message related components may comprise text messaging components, (e.g. instant messaging (e.g. Apple® Push Notification service (APNs), Android® Messaging, among others) and/or chat (e.g. Internet Relay Chat (IRC))), etc. (Apple is a trademark of Apple, Inc., Cupertino CA and Android is a trademark of Google LLC, Mountain View, CA). Messaging may be one-to-group or one-to-one.

Figure 13:
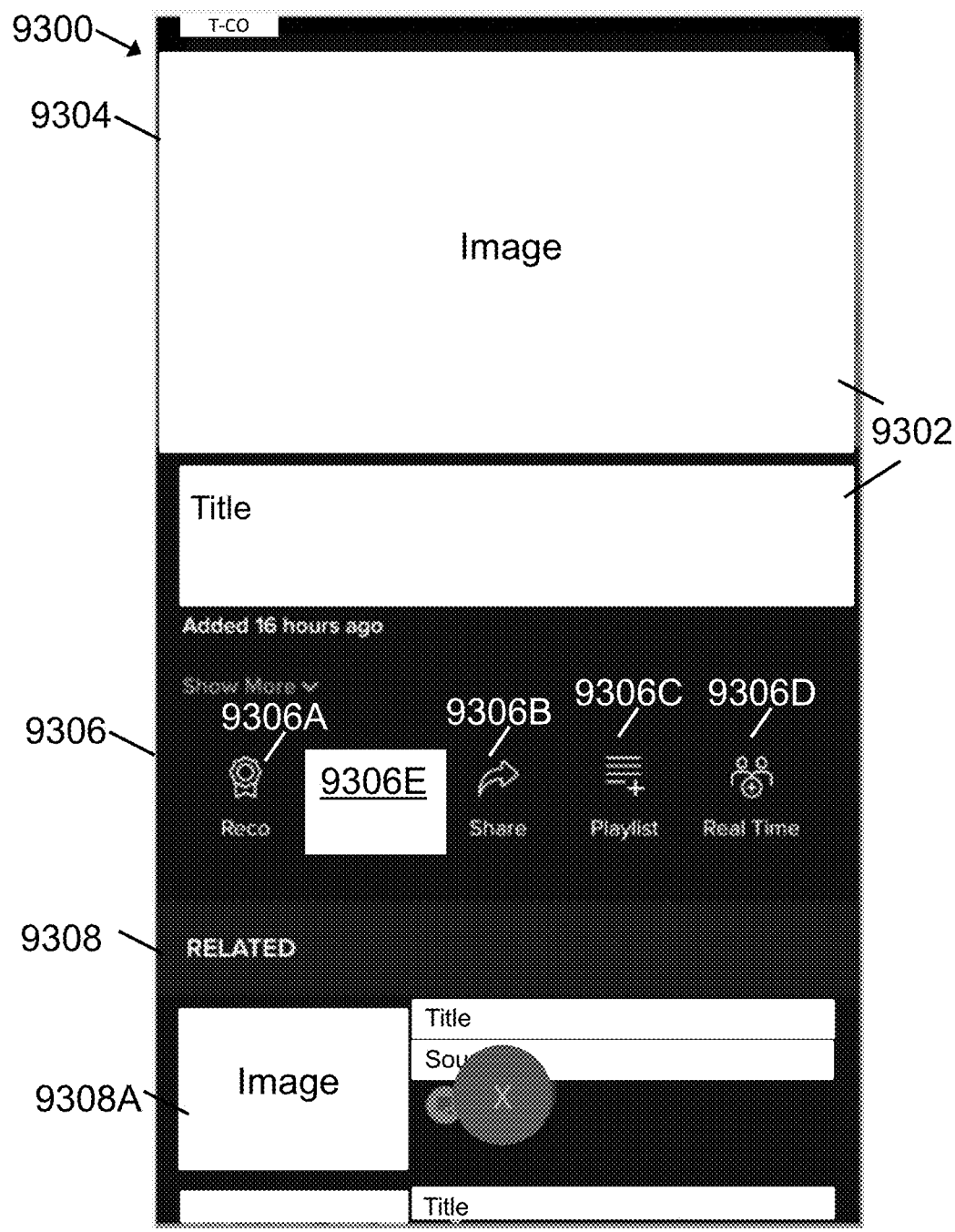
FIGS. 13-24 show various interfaces (e.g. screenshots or snippets thereof) to initiate and participate in a real-time sharing, in accordance with an example.

FIGS. 13-24 show various interfaces (e.g. screenshots or snippets thereof) to initiate and participate in a real-time sharing of one or more content items, in accordance with an example. FIG. 13 shows a content item 9302 selected via a content item feed interface 9300 where a feed of content items is presented in a navigable interface (e.g. scrolling up and down the display screen).

Selection of content item 9302 from the feed (e.g. by tapping or other gestural input) initiates various interface elements including a video player 9304 in a content player portion to play the content item, a control interface 9306 presenting a plurality of icons and associated controls to work with the content item and a related content interface 9308 in respective portions of interface 9300. The video player vplays the content item and the video player 9304 may have various playback controls (not shown) which may be invoked such as by interacting (e.g. via a tap or other gestural input) with the video player 9304.

Control interface 9306 shows icons and associated controls 9306A-9306D for invoking functions via respective interfaces to: recommend, share, add to a playlist, and real time share; the content item 9302. A reserved icon and associated control 9306E is shown redacted.

Related content interface 9308 shows related content items (e.g. 9308A) presented for selection and playing, etc. These are items related in some way (e.g. topic or category) to item 9302. A control (e.g. X in a circle) is provided to return to the (main) feed interface where navigating the content feed is enabled.

Figure 14:
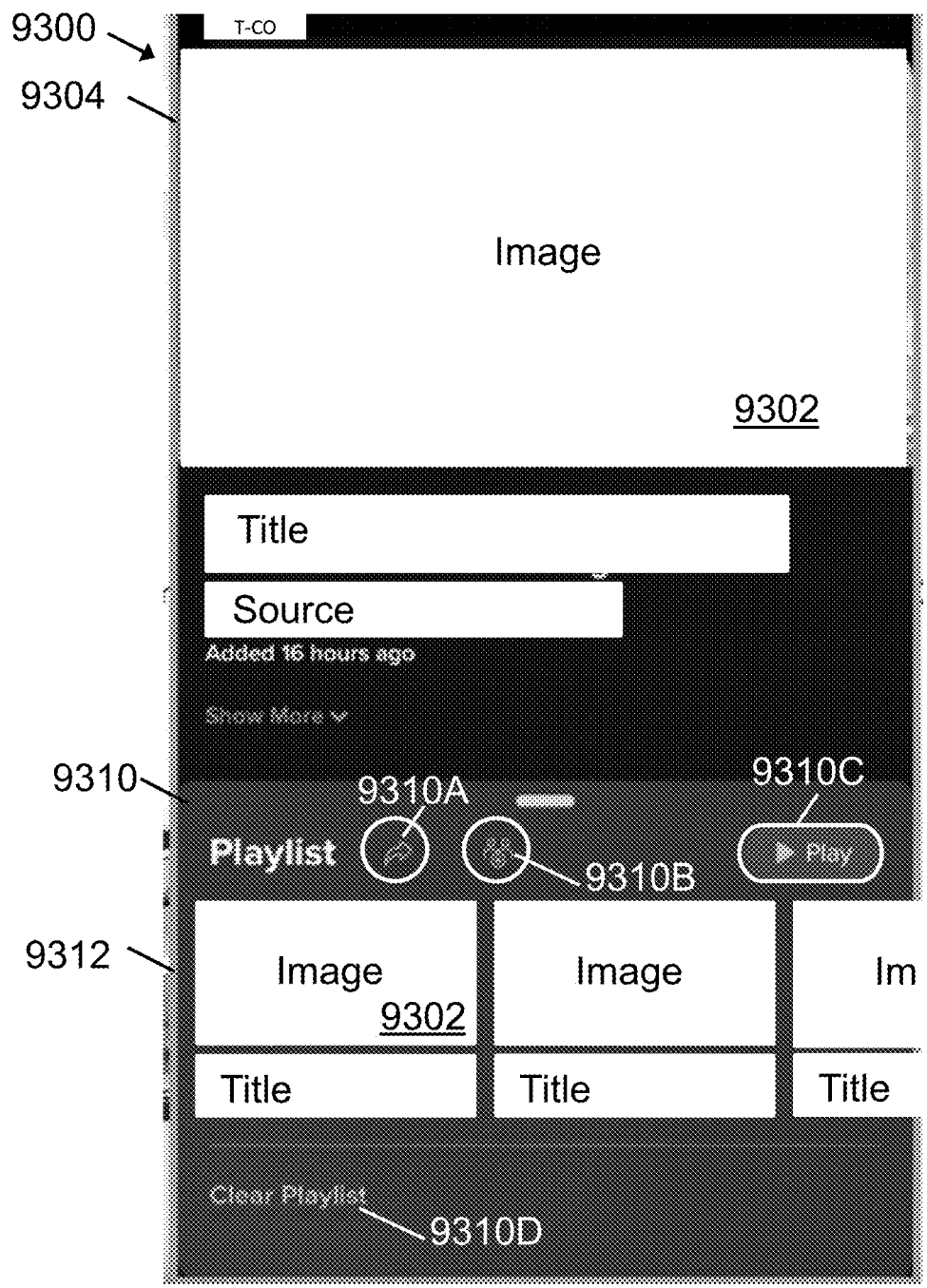

FIG. 14 shows a playlist interface 9310, invoked via icon and control 9306C, under video player 9304 that adds content item 9302 to a playlist. The playlist interface 9310 replaces control interface 9306 and related content interface 9306.

Playlist interface 9310 comprises a control 9312 to display the content items (e.g. 9302) in the playlist, which list may be navigated such as by scrolling left/right via control 9312. A thumbnail and title may be shown for each content item such as previously described.

Additional playlist controls include icons and controls 9310A-9310C to share the playlist, real time share the playlist and play (locally) the playlist. A clear playlist control 9310D will clear the playlist of content items. It is understood that the various controls may communicate messages to the server for example to define the playlist (adding or removing items, clearing the list), play content items from the playlist (obtaining the content), etc.

Figure 15:
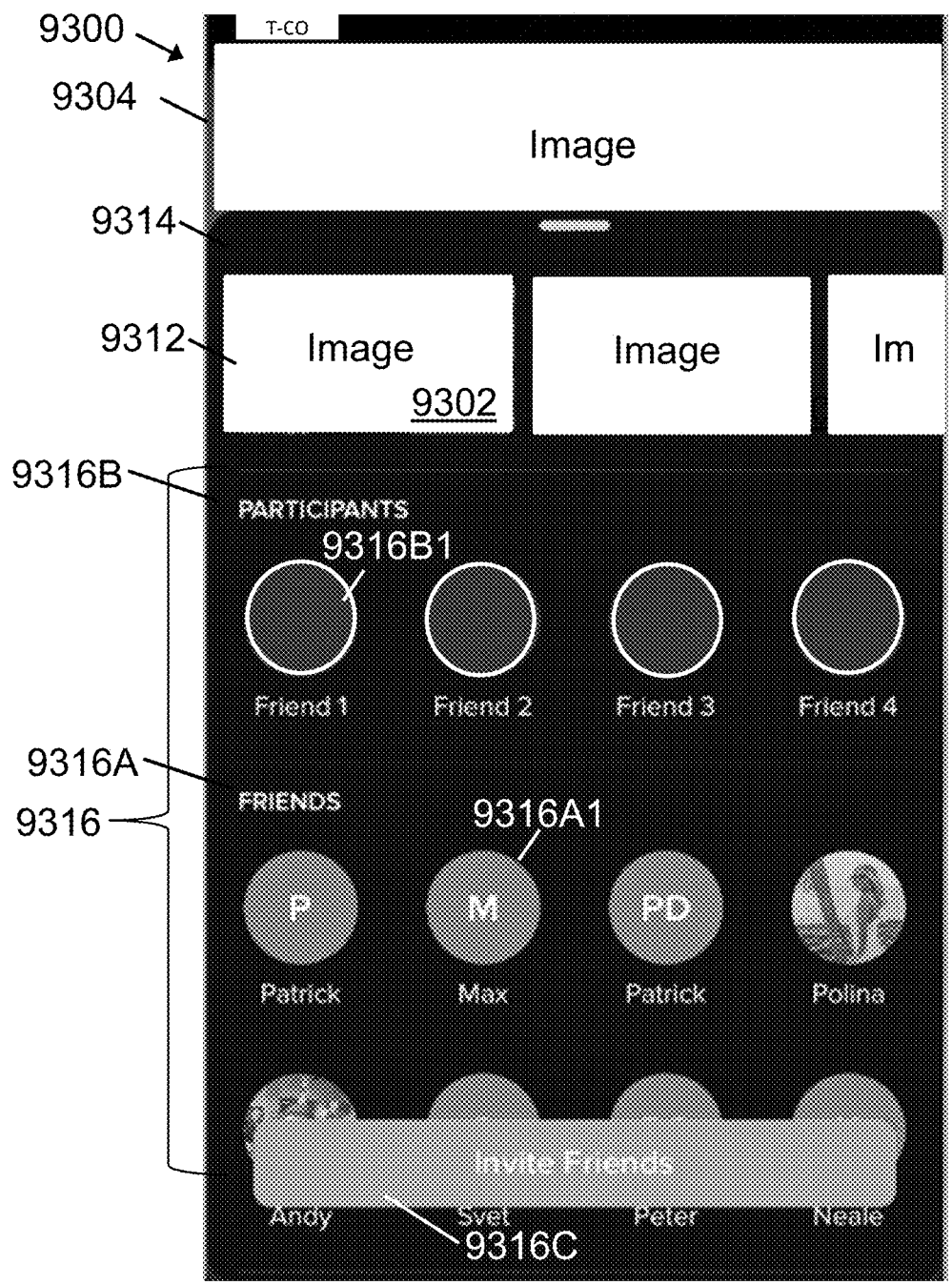

FIG. 15 shows the RTS sharing interface 9314 invoked via icon and associated control 9310C such as from the playlist interface 9310. RTS sharing interface 9314 also presents the playlist via control 9312. In addition RTS sharing interface 9314 shows an invitation interface 9316 to compose and communicate an invitation for friends to participate in an RTS session.

Figure 16:
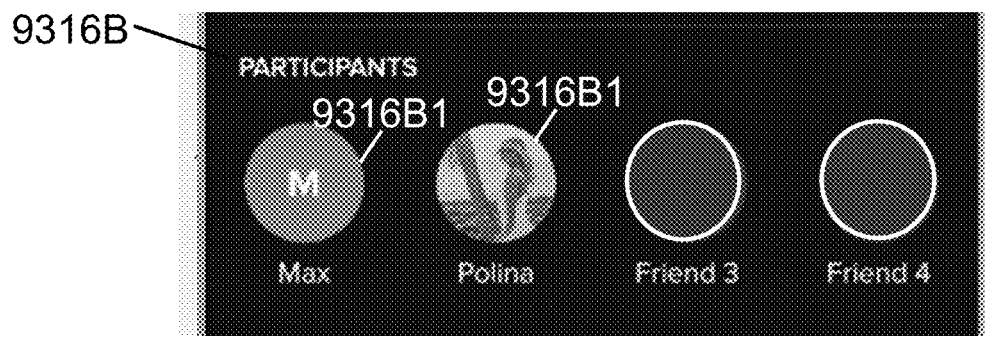

Invitation interface 9316 comprises a friends selector interface 9316A displaying respective friends (e.g. 9316A1) of the present user and a participants interface 9316B displaying participants 9316B1 comprising friends selected for the invitation. FIG. 15 shows the invitation interface 9316 before any friends are selected as participants. Though four participants 9316B1 are shown for an invitation more or fewer participants may be invited. Limits may be determined by multi-cast or other technology used to provide the RTS session or for other reasons. FIG. 16 is a snippet of interface 9300 showing the participant interface 9316*b* with two friends selected as participants 9316B1 and 9316B2. Friends may be represented with icon or avatar icons and may be dragged and dropped from friends interface 9316A to participant positions in participant interface 9316B.

Figure 17:
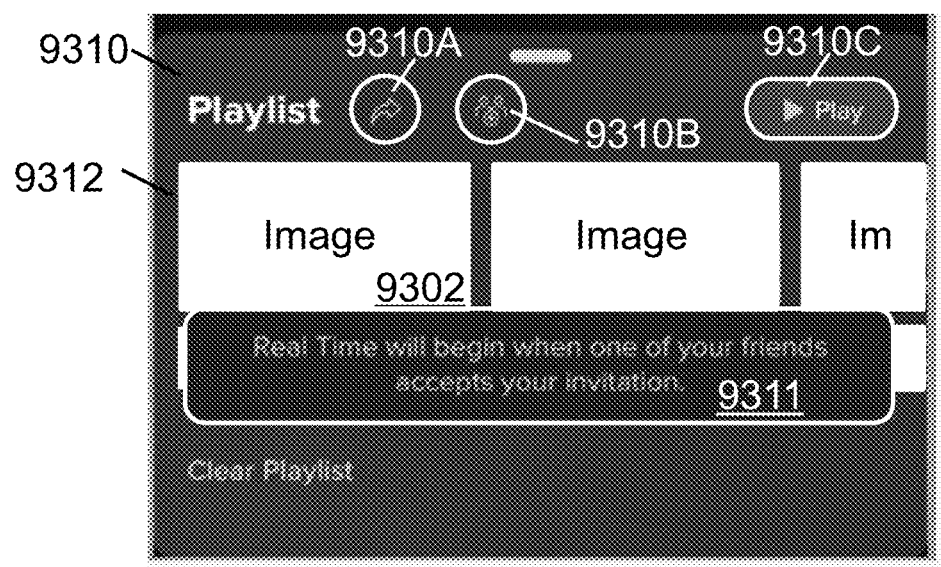

Once the invitation is composed, an invite friends control 9316C may be invoked to send the message to the server to communicate the invitations to the respective participants (friends). The message may send the playlist (or a code/link for same) and the list of participants. FIG. 17 is a snippet of interface 9300 showing the playlist interface 9310 after the invite friends control 9316C is invoked. A message 9311 indicates that the RTS session will begin once one friend accepts the invitation.

Figure 18:
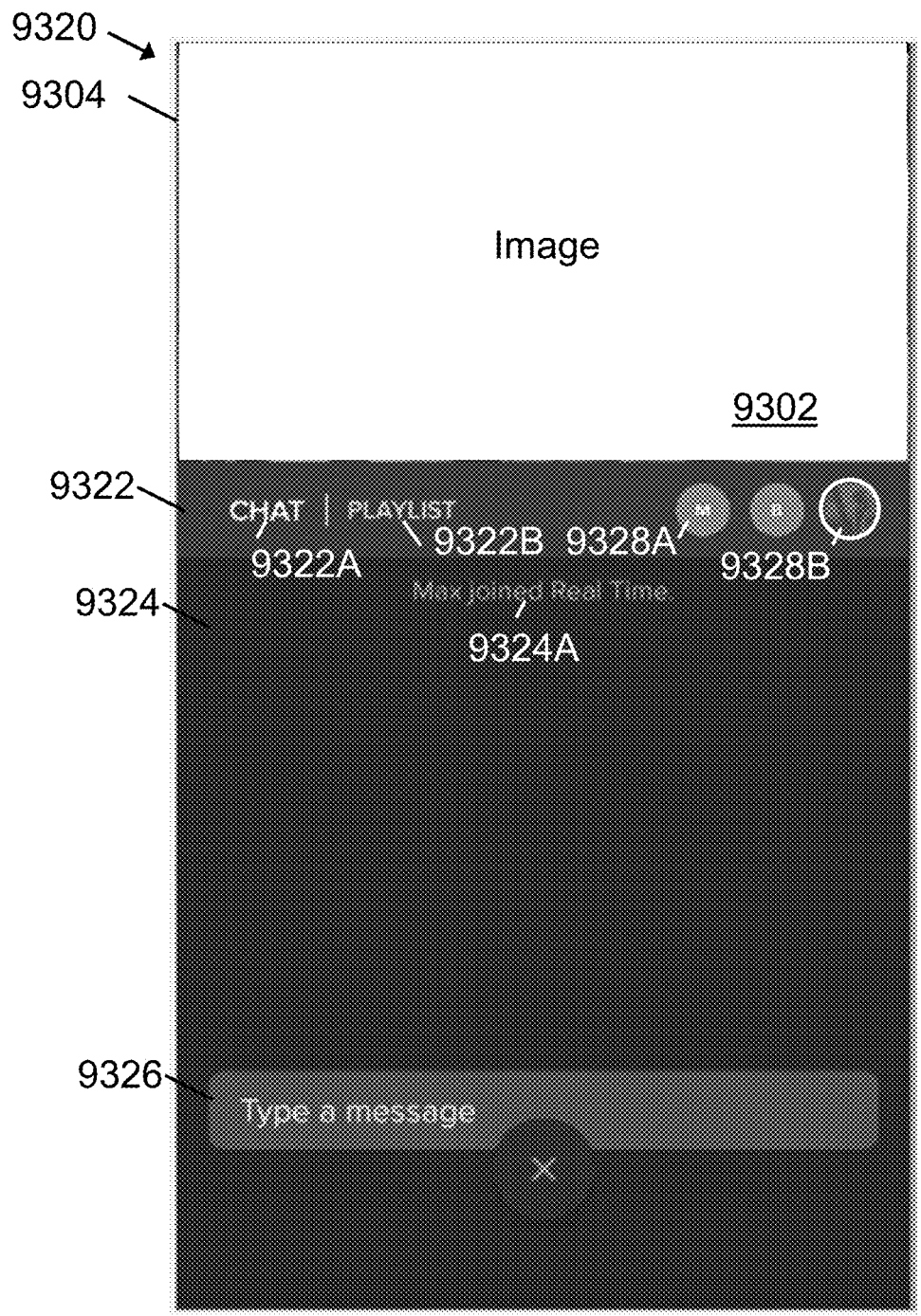
Figure 19:
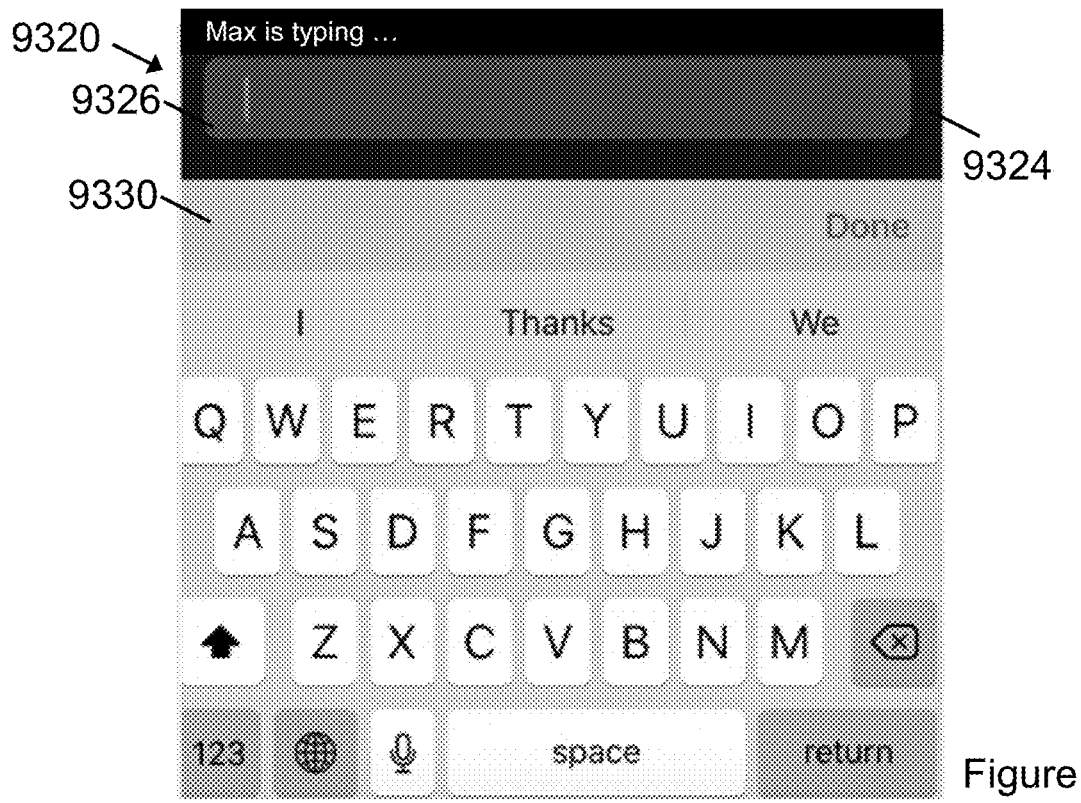

FIG. 18 shows an RTS session interface 9320 such as from the first user device. RTS session interface 9320 includes a portion providing video player 9304 playing a content item such as 9302 from the playlist shared via an invitation as described with reference to FIGS. 15-17. RTS session interface 9320 includes session interaction interface 9322 having tabs (controls) 3322A and 9322B to select between a chat interface and an RTS session playlist interface. Session interaction interface 9322 also shows the participants such as in the form of icons (e.g. 9326A, 9326B). Invited participants who have not accepted may be shown such as in a diminished or contrasting tone to distinguish those who have accepted (or initiated) the invitation.

Figure 20:
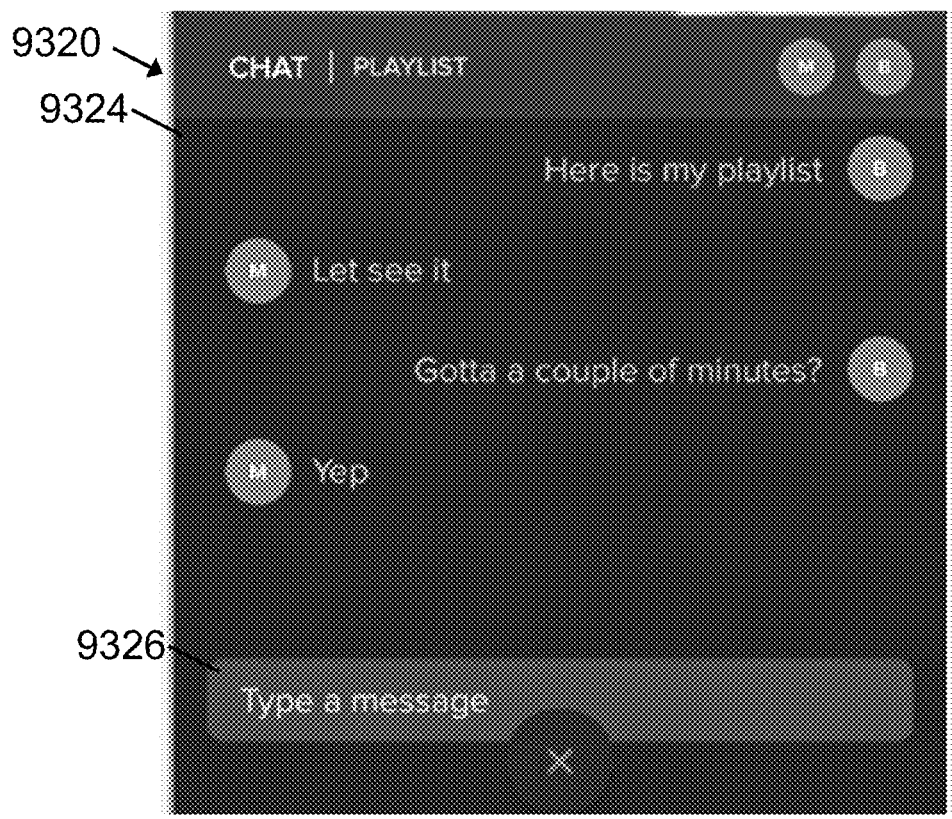

The chat tab 9322A is presently active in FIG. 18 showing chat interface 9324 including an event log message 9324A. A type message control 9326 invokes the composition of a (text) message for sending via the server to the participants, which message is displayed in association with the sender in chat interface 9324. A keyboard 9330 may be brought up as shown in the snippet of interface 9320 of FIG. 19 when the type message control 9326 is invoked. Though not shown, when the keyboard 9330 is displayed, the session interaction interface 9322 may be pushed up to push the video player 9304 off the top of the display screen and when use of the keyboard 9330 is finished (e.g. via a done control) the keyboard 9330 is removed and the session interaction interface 9322 and video player 9304 are moved down the screen. Chat interface 9324 may present message regarding activities on participant devices such as indicating whether another participant is typing. FIG. 20 is a snippet of RTS session interface 9320 showing chat interface 9324 with a plurality of messages in a chat session for an example RTS session between two friends. Though text is described, other content types may be enabled for sharing, but it may be preferred for bandwidth or other reasons to limit content type to text.

Figure 21:
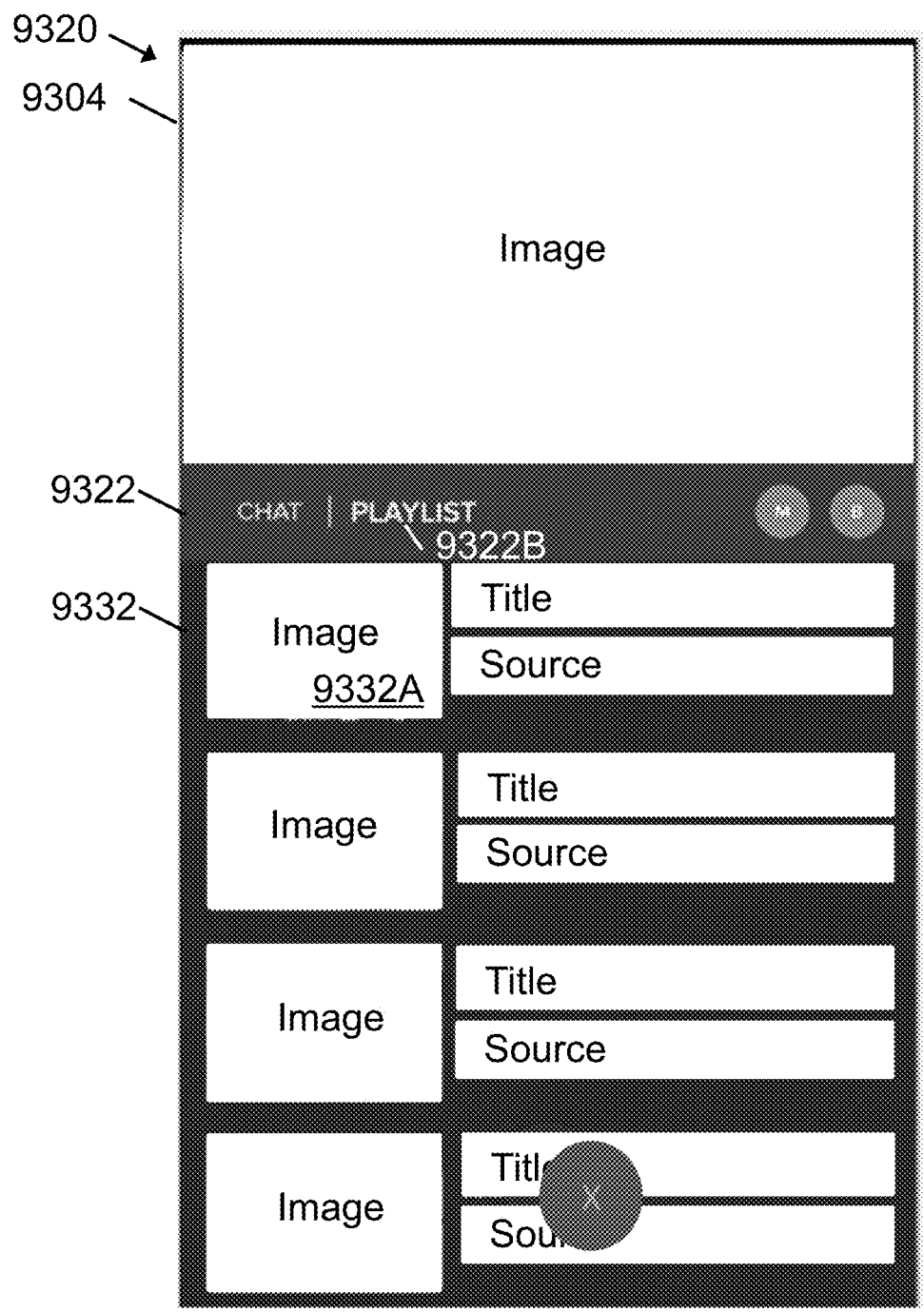
Figure 22:
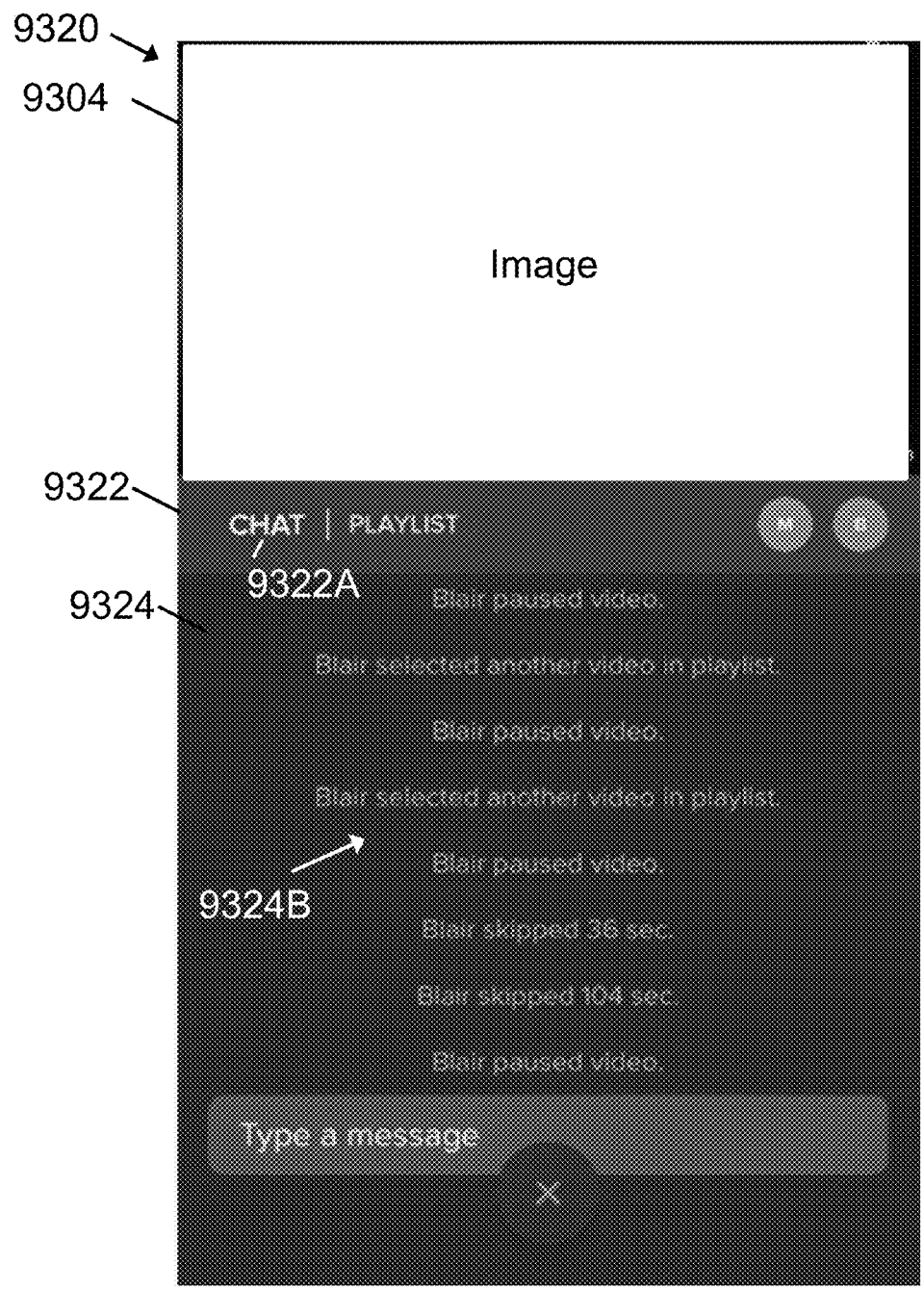

FIG. 21 shows RTS session interface 9320 with playlist tab 9322B active and showing session playlist interface 9332 for an RTS session between two friends. The playlist interface 9332 is navigable and individual content items (e.g. 9332A) may be selected for play in video player 9304. Video player 9304 may be controlled such as described. Interaction events with the playlist and video(s) and other events (e.g. playlist play back completed) may be logged as described and messages communicated to the participants. FIG. 22 shows the chat tab activated with chat interface 9324 showing event log messages 9324D. Such messages are shown in all participant screens.

Figure 23:
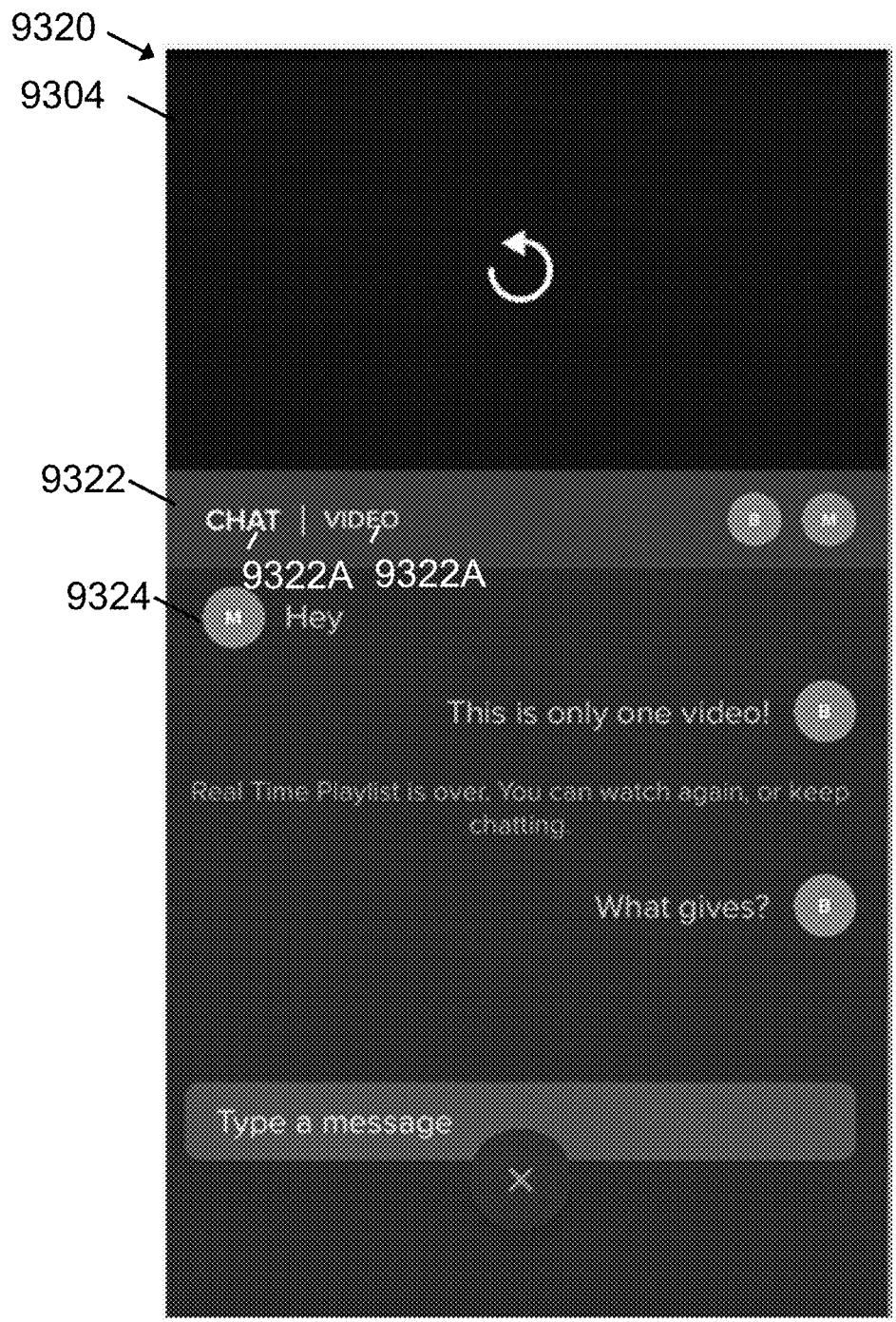
Figure 24:
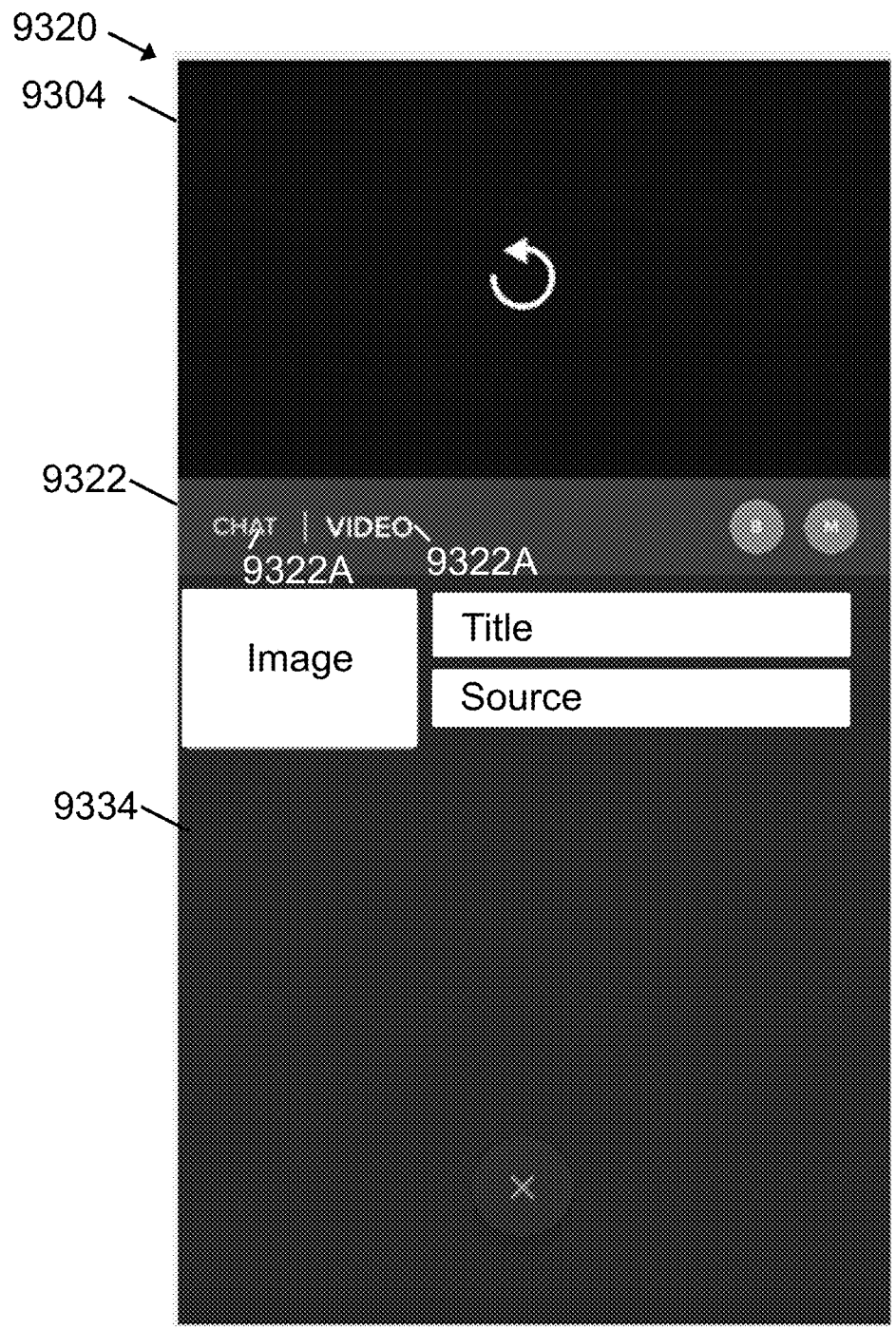

As noted, a single video (content item) may be shared via real-time sharing. FIG. 23 shows RTS session interface 9320 with a single video shared for two participants. RTS session interface 9320 comprises session interaction interface 9322 having tabs (controls) 3322A and 9322C to select between the chat interface 9324 and an RTS session video interface 9334 (FIG. 24). FIG. 24 shows RTS session video interface 9334 with a single video content item 9334A. This item may be selected to play or replay, etc. The video player may be controlled such as described previously. Events may be logged and the message communicated and presented via the chat interface 9324 (e.g. FIG. 23).

Notifications

Figure 25:
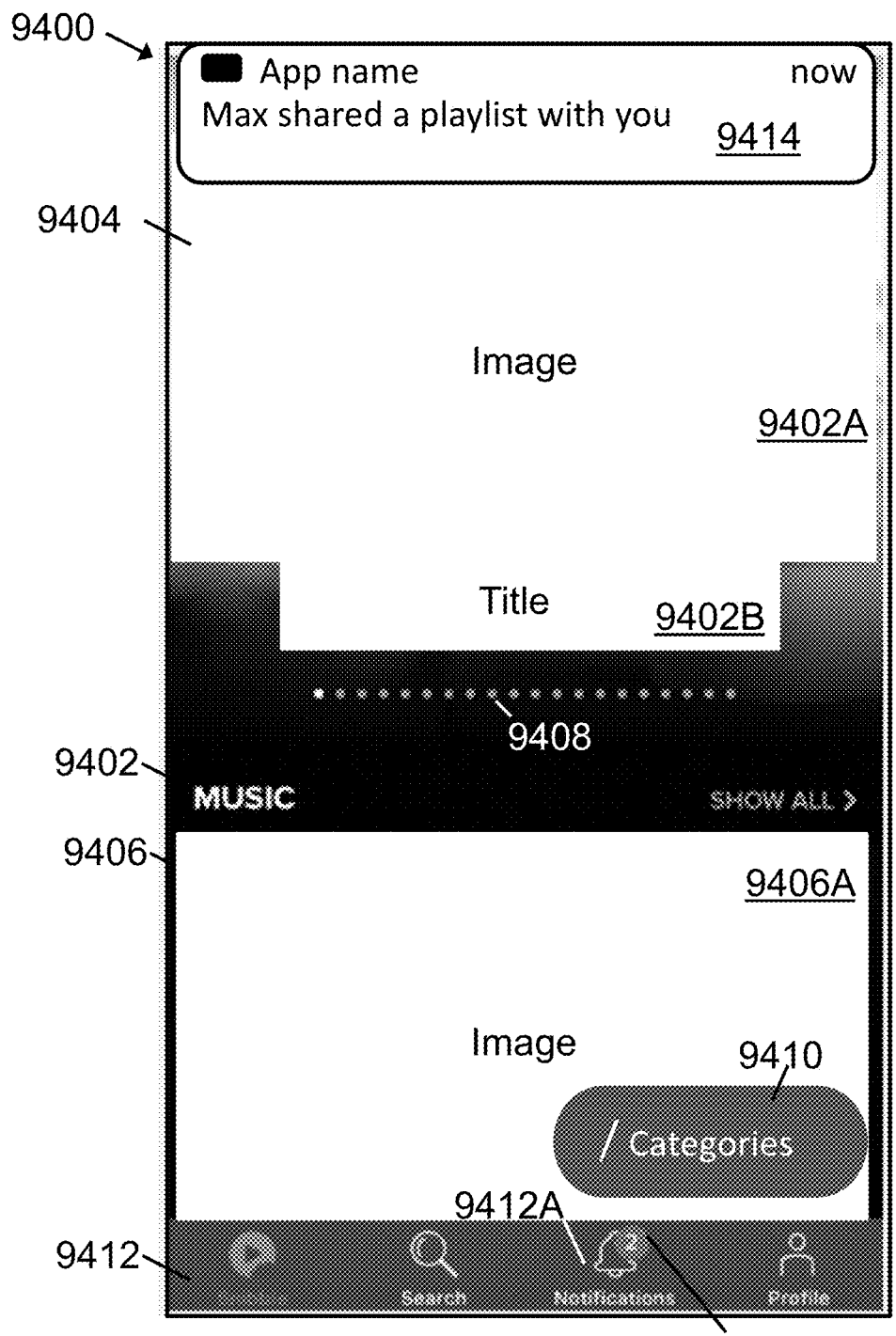
FIGS. 25-27 show various interfaces (e.g. screenshots or snippets thereof) of a notifications feature.
Figure 26:
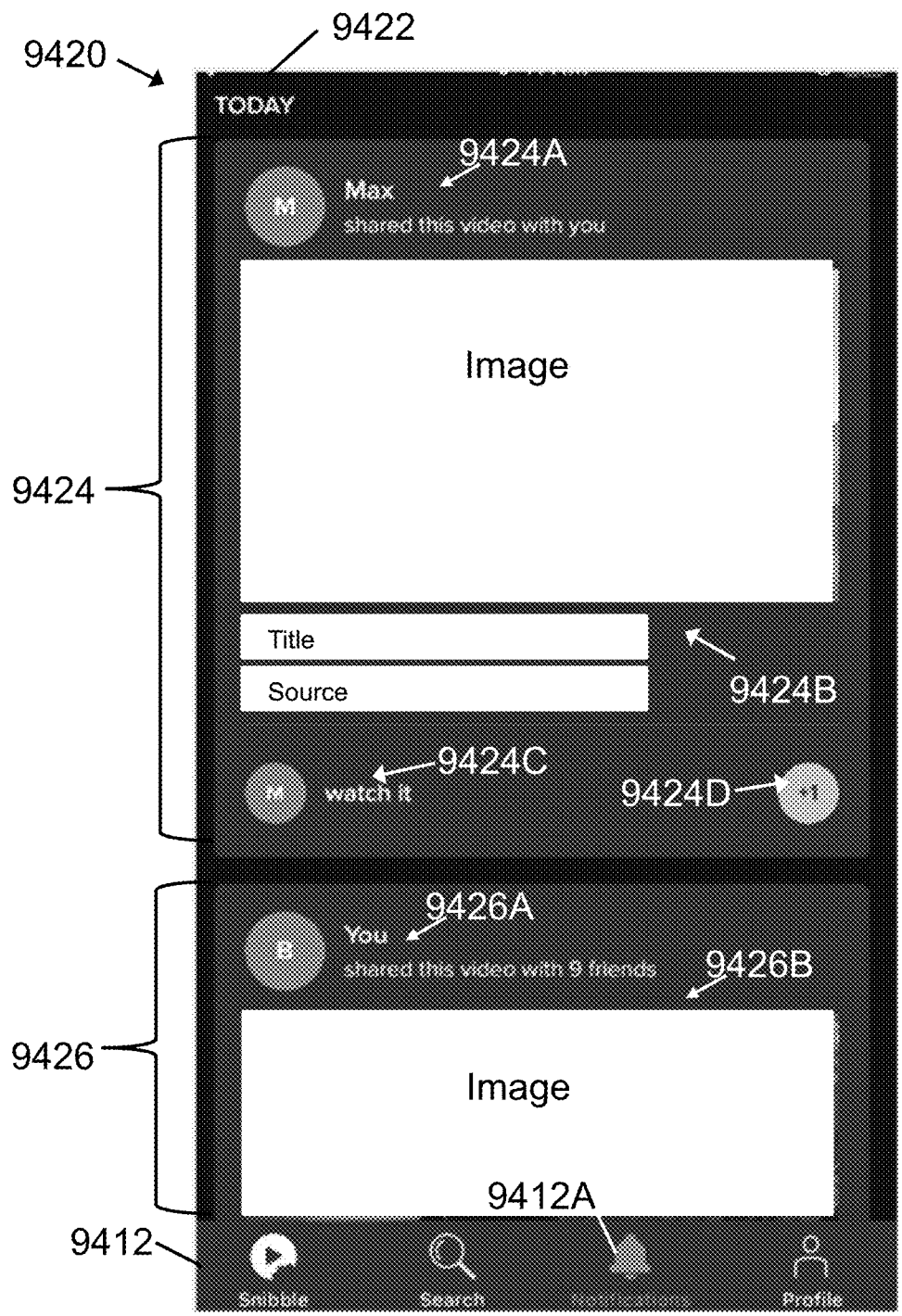
Figure 27:
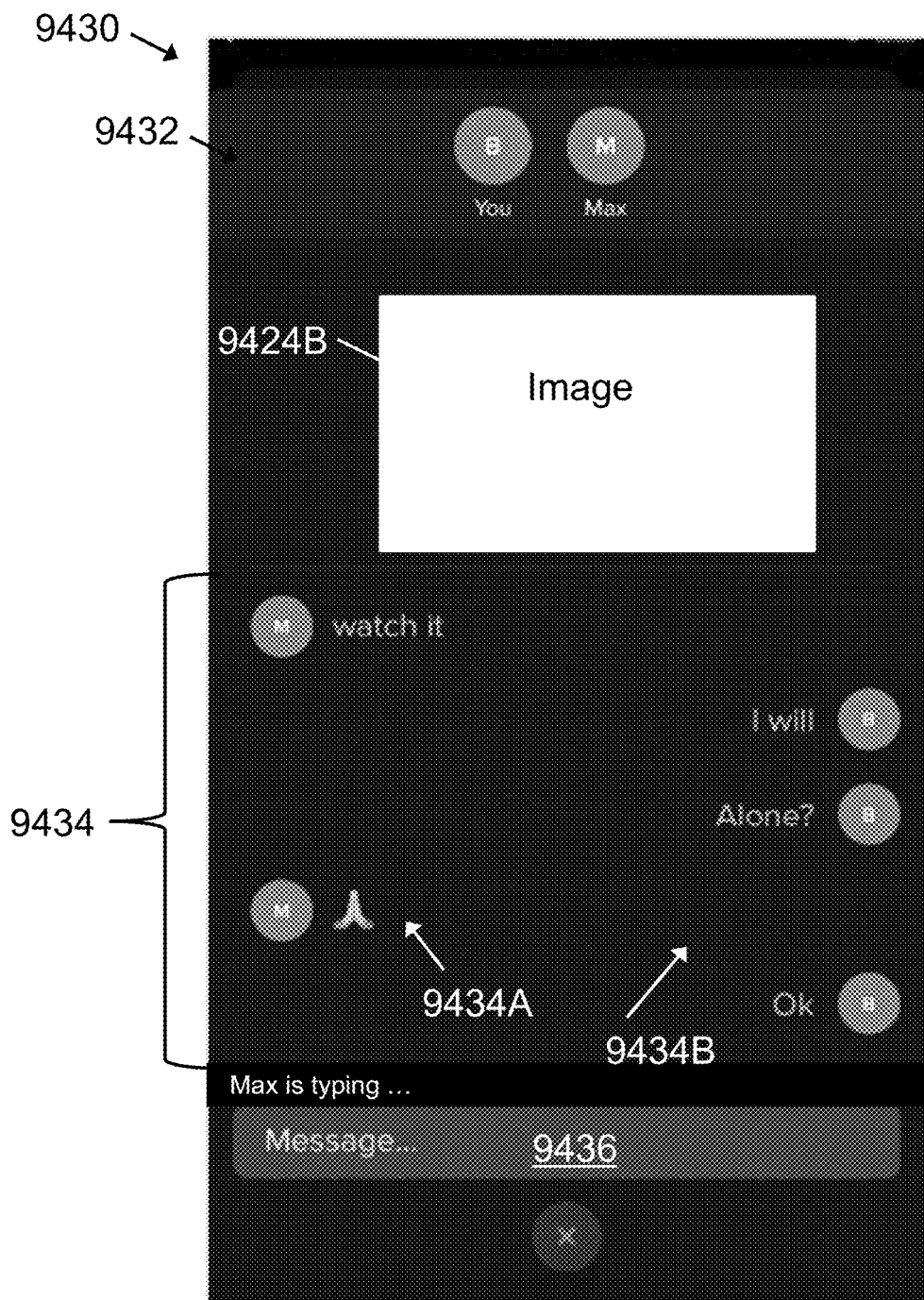

FIGS. 25-27 show various interfaces (e.g. screenshots or snippets thereof) of a notifications feature. FIG. 25 shows a screenshot of a categories interface 9400 with which to view a feed of content items. Content items in a feed of items for a particular user may be grouped by category (e.g. topic). Categories interface 9400 may be divided into a plurality of respective individual category interfaces such as category interface 9402 for music. Categories interface 9400 may be navigable to move between category interfaces such as by scrolling up and down. Each respective category interface may show a content item (e.g. see content item 9494 in one category interface and content item 9406 in another where the content items comprise respectively images 9402A, 9494A and titles 9402B, 9404B). Respective category interfaces may be navigated such as by scrolling left or right. A scroll control such as 9408 may be provided for each respective category interface. As noted, gestural input may be used. A categories control 9410 may be provided to receive input such as keyword to filter or search categories via an interface (not shown). Classifier 9002 may be configured to assign each content item to respective categories.

Similar to functions control portion 9208, categories interface 9400 shows functions control portion 9412 with icons and associated controls. One icon 9412A represents a notifications function. Notifications may relate to messages received such as from friends or sent to friends or received from the application. Messages to friends or from friends may include shares, recommendations, etc. A count of unread notifications—a new notification indicator—may be provided such as by a count icon 9410B and maintained in response to reading notification messages such as in a notifications interface.

In addition to a notification indicator on the notifications icon, app notifications (e.g. 9414) delivered via that user device's operating system notification function may be provided such as in a conventional manner.

FIG. 26 shows notifications interface 9410 in which a listing of notifications is presented. The notifications may be presented in an order such as chronologically as indicated by Today label 9422, though other orders are contemplated (e.g. alphabetically by sender, by type, etc.). FIG. 26 shows notification 9424 and notification 9426 (partially illustrated as it extends below the display screen). Notifications interface 9410 also includes a functions control portion 9428 with icons and associated controls. Notifications icon 9412A is highlighted showing that the notification interface is active.

A notification (e.g. 9424, 9426) may comprise a descriptor (e.g. 9424A, 9426A) indicating the source of the notification and a description of the message that has been received. The source may be represented by an icon, avatar icon and/or name. The description may indicate a message type for example, such as a shared video or playlist, etc. A notification may comprise a content item 9424B, 9426B which may comprise one or more of a thumbnail image, title and source. As previously noted, the content item may be selected for playing.

A notification may comprise a message text portion (e.g. 9424C) showing associated text message (chat) activity. For example, a share of a video (a message) may be associated with a text message recommending the video or commenting thereon or directing to a portion of the content item, etc. Message text portion (e.g. 9424C) may show a message and a message source.

An unread icon with an associated control may be provided (e.g. 9424D), which may show a count of unread messages, to engage a messaging interface for the text (chat) between the source and the present user (or a group if applicable). FIG. 27 shows a messaging interface 9430 invocable through the notification interface 9420. Messaging interface 9430 may have a portion showing the messaging participants (the source of the notification message and the present user), a content item associated with the notification (e.g. 9424B) and text message content portion showing respective messages 9434A and 9434B from the participants. A message input control 9436, similar to control 9326 which may bring up a keyboard, is provided to compose a message. Message activity (or other presence information) of the other participant's user device may be indicated (e.g. Max is typing . . . ). As noted voice input may be received such as for a message composition (not shown).

Computing Unit Implementation

The processor module 1230 may represent a single processor with one or more processor cores or an array of processors, each comprising one or more processor cores. The memory module 1220 may comprise various types of memory (different standardized or kinds of Random Access Memory (RAM) modules, memory cards, Read-Only Memory (ROM) modules, programmable ROM, etc.). The storage module 1400 may represent one or more logical or physical as well as local or remote hard disk drive (HDD) (or an array thereof). The storage module 1400 may further represent a local or remote database made accessible to the network node 1200 by a standardized or proprietary interface. The network interface module 1210 represents at least one physical interface that can be used to communicate with other network nodes. The network interface module 1210 may be made visible to the other modules of the network node 1200 through one or more logical interfaces. The actual stacks of protocols used by the physical network interface(s) and/or logical network interface(s) of the network interface module 1400 do not affect the teachings herein. The variants of processor module 1230, memory module 1220, network interface module 1210 and storage module 1400 usable in the context will be readily apparent to persons skilled in the art. Likewise, even though explicit mentions of the memory module 1220 and/or the processor module 1230 are not made throughout the description of the present examples, persons skilled in the art will readily recognize that such modules are used in conjunction with other modules of the network node 1200 to perform routine as well as innovative steps related to the present disclosure.

It is understood that client computing device 1500 comprises similar components to server 1200 that is typically configured appropriately for a client and as a user device.

Various network links may be implicitly or explicitly used in the context shown and described herein. While a link may be depicted as a wireless link, it could also be embodied as a wired link using a coaxial cable, an optical fiber, a category 5 cable, and the like. A wired or wireless access point (not shown) may be present on the link between. Likewise, any number of routers (not shown) may be present and part of the link, which may further pass through the Internet.

The teachings herein are not affected by the way the different modules exchange information between them. For instance, the memory module and the processor module could be connected by a parallel bus, but could also be connected by a serial connection or involve an intermediate module (not shown) without affecting the teachings herein.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description has been presented for purposes of illustration but is not intended to be exhaustive or limited to the disclosed embodiments. Many modifications and variations will be apparent to those of ordinary skill in the art. The embodiments were chosen to explain the principles of the teachings herein and their practical applications and to enable others of ordinary skill in the art to understand the teachings in order to implement various embodiments with various modifications as might be suited to other contemplated uses.

What is claimed is:

1. A computer-implemented method comprising:
   providing, through a computer network via a server computer, a video content distribution and social media platform to communicate video content from a plurality of content sources to respective user devices of platform users, wherein the platform associates two or more of the platform users as friends in accordance with respective permissions of the two or more platform users;
   receiving, at the platform, a real time sharing (RTS) session invitation from a platform user to invite at least one participant defined from the platform user's friends to participate in a RTS session of at least one RTS content item with the platform user;
   sending from the platform the RTS session invitation to the at least one participant; and
   providing the RTS session of the at least one RTS content item upon receiving an acceptance of the invitation from any one of the participants.

2. The computer-implemented method of claim 1, comprising providing an interface to receive and communicate the RTS session invitation.

3. The computer-implemented method of claim 1, wherein providing the RTS session comprises communicating, to each of the participants who have accepted the invitation, the at least one RTS content item for synchronized playing.

4. The computer-implemented method of claim 3, wherein the synchronized playing of the at least one RTS content item is under a control of the platform user.

5. The computer-implemented method of claim 3, comprising providing an interface to receive and communicate text messages to the participants during the RTS session, wherein the text messages are communicated for displaying in an interface associated with the synchronized playing of the at least one RTS content item.

6. The computer-implemented method of claim 5, comprising receiving and communicating event log messages to the participants during the RTS session.

7. The computer-implemented method of claim 1, wherein the at last one RTS content item is a playlist of content items.

8. The computer-implemented method of claim 1, wherein the platform user and at least one of the participants who have accepted the invitation are remotely located from one another.

9. The computer-implemented method of claim 1, wherein any of the user devices comprises a mobile device.

10. The computer-implemented method of claim 1, comprising providing a friendship interface to enable the platform user to invite another platform user to be a friend on the platform and associating as friends in accordance with a response providing permission from the other platform user.

11. The computer-implemented method of claim 1, comprising providing an advertisement targeted to the platform user, the at least one advertisement selected in response to at least the platform user's respective user data.

12. The computer-implemented method of claim 1, comprising communicating a sharing of a playlist or a content item, a recommendation, a real time sharing of a playlist or a content item or a text message as platform messages to the platform user's device each of which platform message has a platform message type and each of which platform message triggers a notifications function of the platform user's device to notify of a receipt of a platform message.

13. The computer-implemented method of claim 12, wherein the platform user's device provides a notifications interface for the notifications; and wherein the notifications interface facilitates interaction with the respective platform messages wherein interaction comprises any one or more of invoking playing of content item associated with a respective platform message; communicating a text message to a friend who originated the platform message; and deleting the platform message.

14. The computer-implemented method of claim 1, comprising communicating instances of video content to the platform user in video feeds in accordance with the platform user's user data.

15. The computer-implemented method of claim 14, comprising determining a video feed for the platform user in response to classification data for instances of video content available to provide to the platform user's device and the platform user's user data.

16. The computer-implemented method of claim 15, comprising analyzing the video content to generate the classification data.

17. The computer-implemented method of claim 1, comprising receiving from the platform user a comment and sending the comment to at least one other platform user for display, wherein the comment is only visible to the platform user and the at least one other platform user.

18. A computing device comprising a processing unit and a non-transient storage device storing instructions, which instructions when executed by the processing unit configure the computing unit to:
   provide, through a computer network, a video content distribution and social media platform to communicate video content from a plurality of content sources to respective user devices of platform users, wherein the platform associates two or more of the platform users as friends in accordance with respective permissions of the two or more platform users;

receive, at the platform, a real time sharing (RTS) session invitation from a platform user to invite at least one participant defined from the platform user's friends to participate in a RTS session of at least one RTS content item with the platform user;

send from the platform the RTS session invitation to the at least one participant; and provide the RTS session of the at least one RTS content item upon receiving an acceptance of the invitation from any one of the participants.

19. A non-transitory computer-readable medium comprising computer program code stored thereon, wherein the code, when executed by one or more processors, causes the one or more processors to perform a method comprising:

providing, through a computer network, a video content distribution and social media platform to communicate video content from a plurality of content sources to respective user devices of platform users, wherein the platform associates two or more of the platform users as friends in accordance with respective permissions of the two or more platform users;

receiving, at the platform, a real time sharing (RTS) session invitation from a platform user to invite at least one participant defined from the platform user's friends to participate in a RTS session of at least one RTS content item with the platform user;

sending from the platform the RTS session invitation to the at least one participant; and providing the RTS session of the at least one RTS content item upon receiving an acceptance of the invitation from any one of the participants.

\* \* \* \* \*